US012230233B2

(12) United States Patent
Spangler et al.

(10) Patent No.: US 12,230,233 B2
(45) Date of Patent: *Feb. 18, 2025

(54) FOLDABLE STRINGED INSTRUMENT

(71) Applicant: Ciari Guitars, Inc., San Diego, CA (US)

(72) Inventors: Jonathan Spangler, San Diego, CA (US); James Lee, Carlsbad, CA (US); Philip Simpson, Escondido, CA (US)

(73) Assignee: Ciari Guitars, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/135,752

(22) Filed: Apr. 18, 2023

(65) Prior Publication Data

US 2023/0368753 A1 Nov. 16, 2023

Related U.S. Application Data

(63) Continuation of application No. 17/879,730, filed on Aug. 2, 2022, now Pat. No. 11,631,386, which is a continuation of application No. 17/075,616, filed on Oct. 20, 2020, now Pat. No. 11,404,032, which is a continuation of application No. 16/301,438, filed as (Continued)

(51) Int. Cl.

| | |
|---|---|
| ***G10D 3/00*** | (2020.01) |
| ***G10D 1/00*** | (2020.01) |
| ***G10D 1/08*** | (2006.01) |
| ***G10D 3/04*** | (2020.01) |
| ***G10D 3/06*** | (2020.01) |

(Continued)

(52) U.S. Cl.

CPC ................. *G10D 3/04* (2013.01); *G10D 1/00* (2013.01); *G10D 1/08* (2013.01); *G10D 3/00* (2013.01); *G10D 3/06* (2013.01); *G10D 3/12* (2013.01); *G10D 3/18* (2013.01)

(58) Field of Classification Search

CPC .. G10D 3/04; G10D 1/00; G10D 1/08; G10D 3/00; G10D 3/06; G10D 3/12; G10D 3/18

USPC ........................................................... 84/291

See application file for complete search history.

(56) References Cited

U.S. PATENT DOCUMENTS

| | | | | |
|---|---|---|---|---|
| 519,409 A * | 5/1894 | Middlebroke | G10D 1/10 | 84/269 |
| 3,910,152 A * | 10/1975 | Kusakawa | G10D 3/147 | 84/307 |

(Continued)

FOREIGN PATENT DOCUMENTS

| | | | |
|---|---|---|---|
| CA | 2698420 A1 * | 10/2011 | G10D 1/08 |
| DE | 10344463 B4 * | 1/2006 | G10D 1/08 |

(Continued)

*Primary Examiner* — Christina M Schreiber

(74) *Attorney, Agent, or Firm* — Jonathan D. Spangler; Jay B. Bell

(57) ABSTRACT

A foldable stringed instrument having a neck and/or body that may assume a reduced profile by folding an upper neck portion away from the playing position through the use of a translating bridge assembly and a translating truss assembly, wherein the foldable stringed instrument is capable of housing or otherwise being coupled to any of a variety of electronics or electrical components (e.g. a smart phone or tablet computer) having one or more applications (apps) for driving the operation, functionality and/or effects associated with the foldable stringed instrument.

19 Claims, 34 Drawing Sheets

Related U.S. Application Data application No. PCT/US2016/048047 on Aug. 22, 2016, now Pat. No. 10,810,974.

(60) Provisional application No. 62/322,232, filed on Apr. 13, 2016.

(51) Int. Cl.
*G10D 3/12* (2020.01)
*G10D 3/18* (2020.01)

(56) References Cited

U.S. PATENT DOCUMENTS

| | | | | | |
|---|---|---|---|---|---|
| 4,073,211 | A * | 2/1978 | Jorgensen | G10D 1/08 | 984/106 |
| 4,111,093 | A * | 9/1978 | Field | G10D 3/095 | 984/106 |
| 4,191,085 | A * | 3/1980 | Litwin | G10D 3/095 | 984/115 |
| 4,254,683 | A * | 3/1981 | Nulman | G10H 3/183 | 84/727 |
| 4,332,184 | A * | 6/1982 | Phillips | G10D 3/04 | 84/307 |
| 4,385,543 | A * | 5/1983 | Shaw | G10D 3/04 | 84/307 |
| 4,592,265 | A * | 6/1986 | Steinberger | G10D 1/08 | 84/327 |
| 4,638,708 | A * | 1/1987 | Kamal | G10D 3/095 | 984/115 |
| 4,686,882 | A * | 8/1987 | Shaw | G10D 1/08 | 984/106 |
| 4,939,970 | A * | 7/1990 | Hoshino | G10D 3/00 | 84/293 |
| 5,233,896 | A * | 8/1993 | Worthington | G10D 1/08 | 84/293 |
| 5,353,672 | A * | 10/1994 | Stewart | G10D 1/085 | 84/293 |
| 5,383,385 | A * | 1/1995 | Gilbert | G10D 1/085 | 84/293 |
| 5,390,578 | A * | 2/1995 | Raymer | G10D 1/085 | 84/293 |
| 5,728,956 | A * | 3/1998 | Feiten | G10D 3/14 | 84/293 |
| 5,949,005 | A * | 9/1999 | Peterson | G10D 1/085 | 84/293 |
| 6,025,548 | A * | 2/2000 | Ehrlich | G10D 3/00 | 84/293 |
| 6,028,255 | A * | 2/2000 | Myronyk | G10D 3/095 | 84/293 |
| 6,353,164 | B1 * | 3/2002 | Corsi | G10D 1/08 | 84/293 |
| 6,791,022 | B2 * | 9/2004 | Green | G10H 1/32 | 84/731 |
| 6,833,501 | B2 * | 12/2004 | Jagmin | G10D 3/06 | 84/293 |
| 6,956,157 | B2 * | 10/2005 | Strobel | G10D 1/08 | 84/298 |
| D516,114 | S * | 2/2006 | Leach | G10D 1/08 | D17/20 |
| 7,179,975 | B2 * | 2/2007 | Feiten | G10D 3/04 | 84/312 R |
| 7,332,662 | B2 * | 2/2008 | Kandrack | G10D 1/085 | 84/293 |
| 7,659,467 | B2 * | 2/2010 | Adams | G10D 3/04 | 84/7 |
| 7,696,419 | B2 * | 4/2010 | Chadwick, V | G10D 1/08 | 84/274 |
| 7,705,224 | B1 * | 4/2010 | Ward | G10D 1/08 | 84/267 |
| 7,712,608 | B2 * | 5/2010 | Leach | G10G 7/005 | 190/107 |
| 7,732,689 | B1 * | 6/2010 | Jiang | G10G 5/005 | 248/443 |
| 7,754,950 | B2 * | 7/2010 | Leach | G10D 1/08 | 16/369 |
| 7,872,185 | B1 * | 1/2011 | Chadwick | G10D 1/08 | 84/293 |
| 8,119,892 | B2 * | 2/2012 | Leach | G10D 1/08 | 84/293 |
| 8,183,446 | B1 * | 5/2012 | Ward | G10D 1/08 | 84/267 |
| 8,203,058 | B2 * | 6/2012 | Leach | G10D 1/08 | 84/293 |
| 8,273,974 | B1 * | 9/2012 | Gonzalez | G10D 1/085 | 84/293 |
| 8,288,637 | B2 * | 10/2012 | Kingsley | G10D 3/147 | 84/312 P |
| 8,378,192 | B1 * | 2/2013 | Harmon | G10D 1/085 | 84/327 |
| 8,710,346 | B2 * | 4/2014 | Behringer | G10H 1/18 | 84/615 |
| 9,424,818 | B1 * | 8/2016 | Spangler | G10D 1/08 | |
| 9,466,268 | B2 * | 10/2016 | Knight | G10D 3/14 | |
| 9,514,719 | B1 * | 12/2016 | Ward | G10D 1/05 | |
| 9,633,631 | B1 * | 4/2017 | Lin | G10H 1/32 | |
| 9,697,808 | B1 * | 7/2017 | Sanzo | G10D 1/085 | |
| 10,079,006 | B2 * | 9/2018 | Brain | G10D 1/08 | |
| 10,540,946 | B2 * | 1/2020 | Reddick | G10D 3/02 | |
| 11,631,386 | B2 * | 4/2023 | Spangler | G10D 3/00 | 84/291 |
| 2004/0182220 | A1 * | 9/2004 | Strobel | G10D 1/08 | 84/267 |
| 2004/0194606 | A1 * | 10/2004 | Koeppe, Jr. | G10D 3/06 | 84/293 |
| 2006/0144208 | A1 * | 7/2006 | Kandrack | G10D 3/14 | 84/290 |
| 2007/0056429 | A1 * | 3/2007 | Poschelk | G10D 1/08 | 84/293 |
| 2007/0131082 | A1 * | 6/2007 | Feiten | G10D 3/04 | 84/312 R |
| 2007/0144328 | A1 * | 6/2007 | Johansson | G10D 1/08 | 84/290 |
| 2007/0289427 | A1 * | 12/2007 | Liang | G10D 1/08 | 84/291 |
| 2008/0141488 | A1 * | 6/2008 | Leach | G10D 1/08 | 16/223 |
| 2008/0156180 | A1 * | 7/2008 | Bagale | G10H 1/40 | 84/743 |
| 2009/0084243 | A1 * | 4/2009 | Pyper-Scott | G10D 1/08 | 84/293 |
| 2009/0100981 | A1 * | 4/2009 | Chadwick, V | G10D 1/08 | 84/293 |
| 2011/0308373 | A1 * | 12/2011 | Leach | G10D 1/08 | 84/293 |
| 2013/0058507 | A1 * | 3/2013 | Arkn S-Pedersen | G10H 1/348 | 84/731 |
| 2014/0047968 | A1 * | 2/2014 | Bagale | G10D 1/08 | 84/267 |
| 2014/0260889 | A1 * | 9/2014 | Anderson | G10D 3/08 | 84/293 |
| 2016/0225351 | A1 * | 8/2016 | Knight | G10D 3/14 | |
| 2018/0053491 | A1 * | 2/2018 | Spangler | G10D 1/08 | |
| 2018/0211639 | A1 * | 7/2018 | Niiro | G10D 1/085 | |
| 2019/0295514 | A1 * | 9/2019 | Spangler | G10D 3/095 | |
| 2021/0056939 | A1 * | 2/2021 | Spangler | G10D 1/00 | |
| 2021/0193087 | A1 * | 6/2021 | Spangler | G10D 3/04 | |
| 2021/0241726 | A1 * | 8/2021 | Brain | G10D 3/04 | |
| 2022/0375437 | A1 * | 11/2022 | Spangler | G10D 1/00 | |

FOREIGN PATENT DOCUMENTS

| | | | | | |
|---|---|---|---|---|---|
| EP | 3361475 | A1 * | 8/2018 | G10D 1/08 | |
| FR | 2429471 | A * | 2/1980 | G10D 1/00 | |
| GB | 2365198 | A * | 2/2002 | G10D 1/08 | |

* cited by examiner

FOLDABLE STRINGED INSTRUMENT

CROSS REFERENCES TO RELATED APPLICATIONS

The present application is a continuation of U.S. patent application Ser. No. 17/879,730 filed Aug. 2, 2022, which issued on Apr. 18, 2023 as U.S. Pat. No. 11,631,386, which is a continuation of U.S. patent application Ser. No. 17/075,616 filed Oct. 20, 2020, which issued on Aug. 2, 2022 as U.S. Pat. No. 11,404,032, which is a continuation of U.S. patent application Ser. No. 16/301,438 filed Nov. 13, 2018, which issued on Oct. 20, 2020 as U.S. Pat. No. 10,810,974, which is a national stage entry of PCT/US2016/048047 filed Aug. 22, 2016, which claims the benefit of priority to U.S. Provisional App No. 62/322,232 filed Apr. 13, 2016. The entire content of each related application is hereby expressly incorporated by reference into this disclosure as if set forth fully herein.

BACKGROUND OF THE INVENTION

I. Field of the Invention

The present invention relates generally to stringed musical instruments and, more particularly, to stringed musical instruments (such as a guitar) capable of being played anywhere, but configured to assume a reduced profile for ease of travel and/or compact storage.

II. Discussion of the Prior Art

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g. air, train, auto, etc. . . . ), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. The present invention is directed at overcoming, or at least improving upon, the disadvantages of the prior art.

SUMMARY OF THE INVENTION

The present invention accomplishes this goal by providing a foldable stringed instrument in the form (by way of example only) of a travel guitar wherein at least one of the neck and body may assume a reduced profile. While referred to hereinafter within the context of a travel guitar, it will be appreciated that the scope of the invention extends beyond guitars and may include, by way of example only, any of a variety of stringed instrument that would benefit from a reduced profile for ease of travel and/or storage. According to one aspect, the travel guitar may be configured to house or receive or otherwise couple to a tablet computer (e.g. iPad by Apple, Inc.) and/or a smart phone (e.g. iPhone by Apple, Inc.) having one or more applications (apps) for driving the operation, functionality and/or effects associated with the travel guitar. According to one aspect, portions of the neck may be foldable to facilitate configuring the travel guitar into a reduced profile.

In another aspect, the travel guitar may be configured such that a bridge assembly can be translated longitudinally relative to the head of the guitar to allow sufficient detensioning of the guitar strings to enable an upper portion of the neck to be folded away from a lower portion of the neck and/or body to assume a reduced profile. When it is desired to deploy the travel guitar for playing, the upper portion of the neck may be unfolded into alignment with the lower portion of the neck and/or body, and the bridge assembly translated longitudinally relative to the head and locked in position to allow the guitar to be tuned for playing. Translation or movement of the bridge assembly may be accomplished manually (e.g. through the use of a handle member or other manual actuation mechanism coupled to the bridge assembly) and/or through the use of servo motors (not shown) disposed with the guitar which, when actuated, will move the bridge assembly relative to the neck of the guitar to selectively tension and detension the strings. In either embodiment (manual or automated), the physical movement of the bridge assembly may be effectuated by coupling the bridge assembly to slidable rail(s) within the body and/or slidable plate(s) on the surface of the travel guitar. In one aspect, one or more pick-ups may be translated longitudinally with the bridge assembly 20.

In another aspect, the travel guitar may be configured with one or more translating truss rods or truss assemblies housed within at least a portion of the neck to bolster its strength and rigidity for more accurate and prolonged tuning and fret alignment. In one aspect, the translating truss rods are rigid, unitary structures capable of being translated longitudinally within one or more recesses or passageways formed in the upper neck portion and/or lower neck portion between a locked position and an unlocked position. In the locked position, each unitary truss rod is disposed at least partially within both the lower portion and upper portion of the neck, which locks the upper neck portion in alignment with the lower neck portion. In the unlocked position, each unitary truss rod is disposed within the lower neck portion and/or body portion, and removed from the upper neck portion, which unlocks the upper neck portion and thereby allows it to be folded into a reduced profile.

In one aspect, the translating truss rods or assemblies are rigid, hinged structures capable of being translated longitudinally within one or more recesses or passageways formed in the upper neck portion and/or lower neck portion between a locked position and an unlocked position. Each truss rod is constructed from a rigid upper portion hingedly coupled to a rigid lower portion. In the locked position, the upper portion of each hinged truss rod is disposed at least partially within the upper portion of the neck, the lower portion of each hinged truss rod is disposed at least partially within the lower portion of the neck, and the hinge or hinged section is disposed within either the upper portion or lower portion of the neck. By disposing the hinged portion of the truss rod in the upper or lower portion of the neck, the truss rod or assembly can no longer hinge and thus has strength and rigidity characteristics similar to that of a unitary truss rod. In the unlocked position, the upper portion of each hinged truss rod is disposed at least partially within the upper portion of the neck, the lower portion of each hinged truss rod is disposed at least partially within the lower portion of the neck, and the hinge or hinged section is disposed at the approximate junction or joint between the upper portion and lower portion of the neck. By disposing the hinge or hinged section of the truss rod at the approximate junction or joint between the upper and lower section of the neck, the upper section of the neck may then be folded to assume a reduced profile.

Each truss rod (unitary or hinged) may be translated with or independent of the translating bridge assembly. If translated with the bridge assembly, each unitary truss rod will be moved in the opposite direction as the bridge assembly, while each hinged truss rod may be translated in the either the same or opposite direction as the bridge assembly. The translation of each truss rod (unitary or hinged) may occur simultaneous with the translation of the bridge assembly, or slightly staggered in time. Staggering translation to assume a reduced profile first involves translating the bridge assembly relative to the neck of the guitar (e.g. either towards or away) in order to reduce the tension of the guitar strings, followed by translating each truss rod into the unlocked position such that the upper neck portion may be folded towards the lower neck portion. Staggering translation during deployment of the travel guitar first involves translating each truss rod into the locked position after the upper neck portion and lower neck portion have been brought into longitudinal alignment, followed by translating the bridge assembly relative to the neck of the guitar in order to increase the tension of the guitar strings in preparation for tuning.

Each truss rod may be constructed from a material having properties sufficient to bolster the strength and rigidity of the neck of the travel guitar, including but not limited to metal, carbon fiber, etc Each truss rod may be manufactured having any number of solid cross-sectional shapes (e.g. circular, oval, triangular, etc. . . . ) and/or non-solid cross-sectional shapes (e.g. generally crescent-shaped, generally V-shaped, generally U-shaped, etc. . . . ). If configured having a non-solid cross-sectional shape, the “open” side of the truss rod may be disposed within the neck so as to face generally towards the underside of the neck (versus towards the fret board). This configuration will provide the greatest strength and rigidity for the strut to resist the tendency of the neck to bend under the tension of the guitar strings after they have been tuned.

In one aspect, a foldable stringed instrument is provided having a lower neck portion, an upper neck portion, a translating bridge assembly, and a translating truss assembly. The lower neck portion is moveably coupled to the upper neck portion. The lower and upper neck portions each include a generally flat upper surface with a plurality of spaced apart frets disposed along at least port of the upper surface, and also each include an elongated recess dimensioned to be in linear alignment when the lower and upper neck portions are in linear alignment. The translating bridge assembly is configured to be selectively moved in a linear manner relative to the lower and upper neck portions. The translating bridge assembly is configured to secure a first end of a set of musical strings that extend over the first and second neck portions. Linear movement of the translating bridge assembly in a first direction relative to the lower and upper neck portions increases tension applied to the musical strings to create a tensioned string state. Linear movement of the translating bridge assembly in a second direction relative to the lower and upper neck portions decreases tension applied to the musical strings to create a detensioned string state. The translating truss assembly is dimensioned to be selectively moved in a linear manner within the recesses of the first and second neck portions when the first and second neck portions are in linear alignment. The translating truss assembly includes a hinge disposed between a first elongate truss element and a second elongate truss element. The translating truss assembly is capable of being linearly moved in a first direction when the musical strings are in the detensioned state in order to selectively position the hinge proximate a junction between the lower and upper neck portions such that said lower and upper neck portions can be folded relative to one another about the hinge. The translating truss assembly is also capable of being linearly moved in a second direction when the strings are in said detensioned state in order to position the lower neck portion or the upper neck portion across the junction between the lower and upper neck portions to maintain the lower and upper neck portions in linear alignment.

In another aspect, the first direction of the translating bridge assembly is linearly away from the lower and upper neck portions and the second direction of the translating bridge assembly is linearly towards the lower and upper neck portions.

In another aspect, the first direction of the translating bridge assembly is linearly towards the lower and upper neck portions and the second direction of the translating bridge assembly is linearly away from the lower and upper neck portions.

In another aspect, the first direction of the translating truss assembly is linearly away from the lower and upper neck portions and the second direction of the translating truss assembly is linearly towards the lower and upper neck portions.

In another aspect, the first direction of the translating truss assembly is linearly towards the lower and upper neck portions and the second direction of the translating truss assembly is linearly away from the lower and upper neck portions.

In another aspect, the lower and upper neck portions are moveably coupled such that the lower and upper neck portions maybe folded relative to one another such that the generally flat surface of the lower neck portion is facing generally away from the generally flat surface of the upper neck portion.

In another aspect, the lower and upper neck portions are linearly moveable relative to one another when the musical strings are in the detensioned state.

In another aspect, the upper neck portion may be linearly moved away from the lower neck portion by linear movement of the translating truss assembly in the first direction.

In another aspect, linear movement of the translating truss assembly in the first direction causes the hinge of the translating truss assembly to be positioned in between the lower and upper neck portions to thereby permit the upper neck portion to be folded relative to the lower neck portion.

In another aspect, the foldable stringed instrument includes at least one on-board electrical component and at least one electrical connector to establish electrical communication between the at least one on-board electrical component and at least one external component.

In another aspect, the at least one on-board component includes a battery or battery pack to provide power, an electrical pick-up disposed near the musical strings for picking up electrical signals generated from playing of the musical strings, a piezo electric sensor for sensing vibrations generated from playing the musical strings, a microphone disposed near the musical strings for transmitting sound generated from playing the musical strings, a wireless receiver for receiving wireless communications from an external wireless transmitter, a tuner for tuning the musical strings, a speaker for playing sound generated from at least one of playing the musical strings and a sound generator, and an effects generator for at least one of modifying the sound generated by playing the musical strings and generating sounds other than those generated by playing the musical strings.

In another aspect, the at least one connector includes at least one of an audio jack for connecting headphones, an input jack for coupling at least one of a smart phone and a tablet computer, and an output jack for connecting to at least one of an external amplifier, an external speaker, and an external mixing board.

In another aspect, the foldable stringed instrument includes a recess dimensioned to receive a smart phone, wherein the smart phone is equipped with applications for driving at least one of the operation, functionality and effects associated with the foldable stringed instrument.

In another aspect, the foldable stringed instrument includes a body coupled to the lower neck portion, the body including a handle member coupled to the translating truss element and slidably arranged relative to the body so as to linearly move the translating truss element in the first direction and the second direction.

In another aspect, the foldable stringed instrument includes a body coupled to the lower neck portion, wherein the body includes at least one recess dimensioned to receive at least one of the translating bridge assembly and an actuation mechanism for selectively locking and unlocking the translating bridge assembly.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The travel guitar disclosed herein boasts a variety of inventive features and components that warrant patent protection, both individually and in combination.

Figures 1, 2, 3, 4:
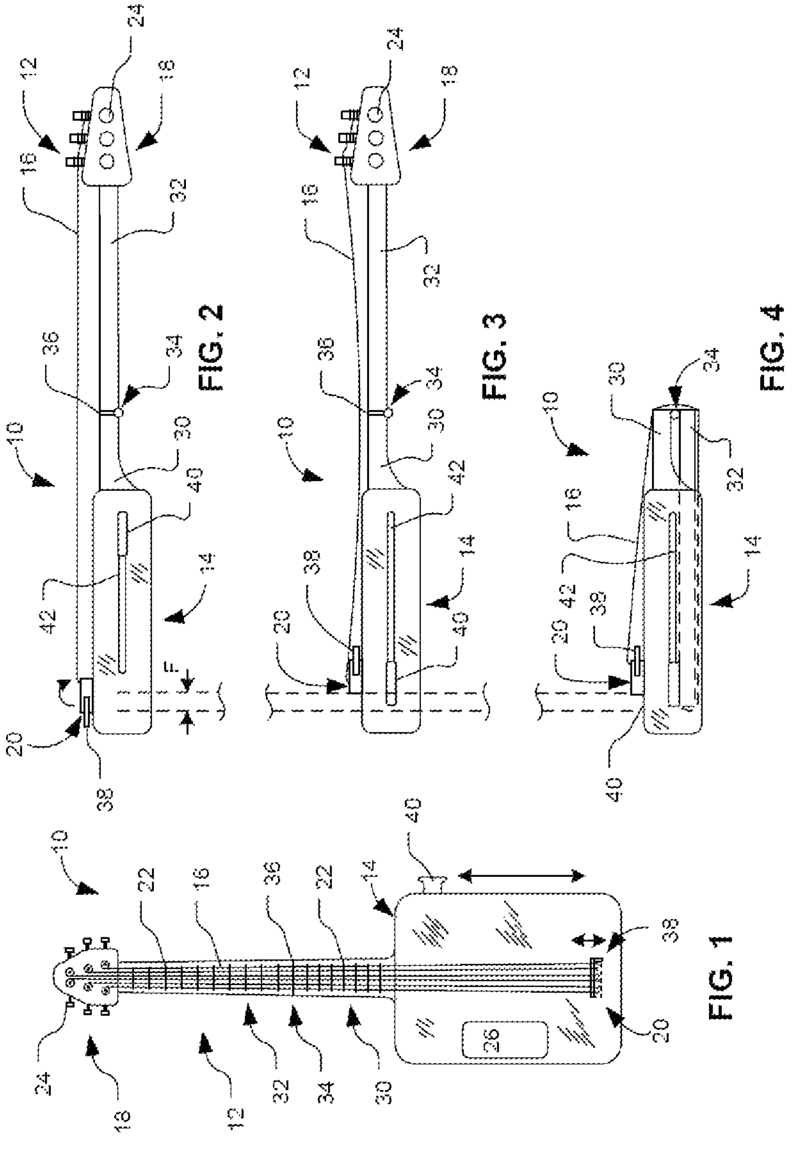
FIG. 1 is a front view of a travel guitar according to one aspect, with the neck configured to be foldable such that an upper portion of the neck folds away from a lower portion of the neck (connected to the body), and an exemplary smart phone (e.g. iPhone) having one or more applications (apps) for driving the operation, functionality and/or effects associated with the travel guitar.
FIGS. 2-4 are side views of the travel guitar of the type shown in FIG. 1, illustrating the manner of folding the upper portion of the neck away from the lower portion of the neck in one aspect.

FIG. 1 illustrates a travel guitar 10 according to one aspect including a neck 12 and a body 14 with a plurality of guitar strings 16 extending between a head 18 coupled to or forming part of the neck 12 and a translating bridge assembly 20 coupled to or forming part of the body 14. The neck 12 includes a plurality of frets 22 which, in use, allow a player of the guitar 10 to create any of a variety of musical notes by depressing the various strings 16 between the various frets 22 as known in the art. The head 18 includes a number of tuning machines 24 to allow the strings 16 to be tuned as known in the art. As will be described below, the travel guitar 10 may be equipped with any of a variety of on-board electronics (e.g. tuners, synthesizers, pick-ups, batteries, AC/DC power, input jacks for amplifiers, etc. . . . ) and may also include the capability to connect to and/or receive a smart phone 26 and/or a computer tablet (not shown) having one or more applications (apps) for driving the operation, functionality and/or effects associated with the travel guitar 10.

The travel guitar 10 is configured to assume a reduced profile by virtue of a "break-neck" functionality accomplished by constructing the neck 12 from a plurality of neck portions, in this case (by way of example only) a lower neck portion 30 and an upper neck portion 32 with a hinge 34 disposed at the approximate junction or joint 36 where the lower and upper neck portions 30, 32 meet. As will be described in detail below, the upper neck portion 32 may be hingedly moved away from the lower neck portion 30 about the hinge 34 such that the travel guitar 10 may transition from the fully deployed state shown in FIGS. 1-3 to the reduced profile shown in FIG. 4. This movement is enabled through the use of the translating bridge assembly 20 along with one or more translating truss rods (not shown) disposed within the neck 12 and body 14, which will now be described.

The bridge assembly 20 can be translated longitudinally relative to the head 18 (e.g. towards) to allow sufficient de-tensioning of the guitar strings 16 to enable the upper neck portion 32 to be folded away from the lower neck portion 30 about the hinge 34 to assume a reduced profile (see FIGS. 2-4). In one aspect, the bridge assembly 20 includes a handle member 38 capable of being rotated or otherwise actuated to allow or force the bridge assembly 20 to move towards the head 18, as illustrated by distance F in FIGS. 2-4. Although not shown, it will be appreciated that the translation of the bridge assembly 20 may be accomplished through the use of servo motors disposed with the body 14 which, when actuated, will move the bridge assembly 20 either towards or away from the head 18 for the purpose of detensioning or tensioning, respectively, the strings 16.

When it is desired to deploy the travel guitar 10 for playing, the upper neck portion 32 may be unfolded back into alignment with the lower neck portion 30, and the bridge assembly 20 translated longitudinally away from the head 18 and locked in position to allow the guitar 10 to be tuned for playing. As described above, this may be accomplished manually through the use of the handle member 38 to bring the bridge assembly 20 in its original position (FIGS. 1 and 2) or, alternatively, through the use of servo motors (not shown) disposed with the body 14 which, when actuated, will move the bridge assembly 20 to its original position (FIGS. 1 and 2). In either embodiment (manual or automated), the physical movement of the bridge assembly 20 may be effectuated by coupling the bridge assembly 20 to slidable rail(s) within the body 14 and/or slidable plate(s) on the surface of the body 14 of the travel guitar 10. In one aspect, one or more pick-ups may be translated longitudinally with the bridge assembly 20.

In another aspect, the travel guitar 10 may be configured with one or more translating truss rods housed within at least a portion of the neck 12 to bolster its strength and rigidity for more accurate and prolonged tuning and fret alignment. As shown in FIGS. 1-4, a handle member 40 is coupled to the body 14 and capable of translating along a track 42 from a position closest the head 18 (FIG. 1-2) to a position farthest away from the head 18 (FIG. 3-4). As will be described in detail below, the handle member 40 is coupled to one or more unitary truss rods and/or hinged truss rods for the purpose of selectively locking and unlocking the upper neck portion 32 relative to the lower neck portion 30 depending on the location of the handle member 40 (e.g. locked in FIGS. 1-2 and unlocked in FIGS. 3-4).

Figure 6:
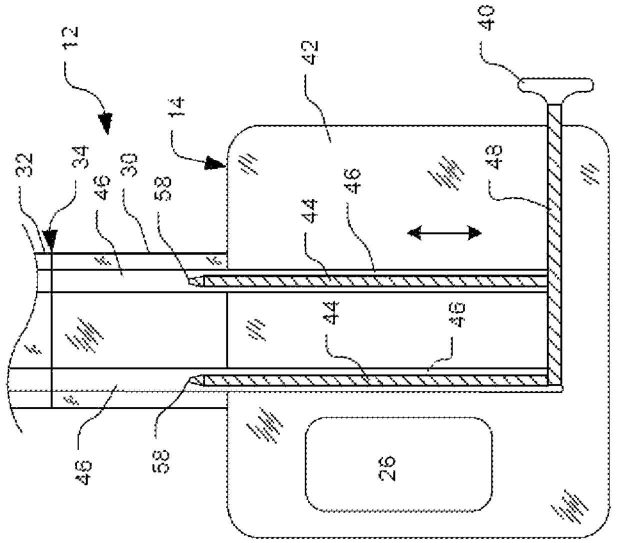
FIG. 6 is a top view of a section of a travel guitar of the type shown in FIG. 1, in partial cross section, illustrating a pair of translating truss rods of unitary construction retracted within recesses from across a joint in the neck for the purpose of unlocking and folding the upper and lower neck sections.
Figure 5:
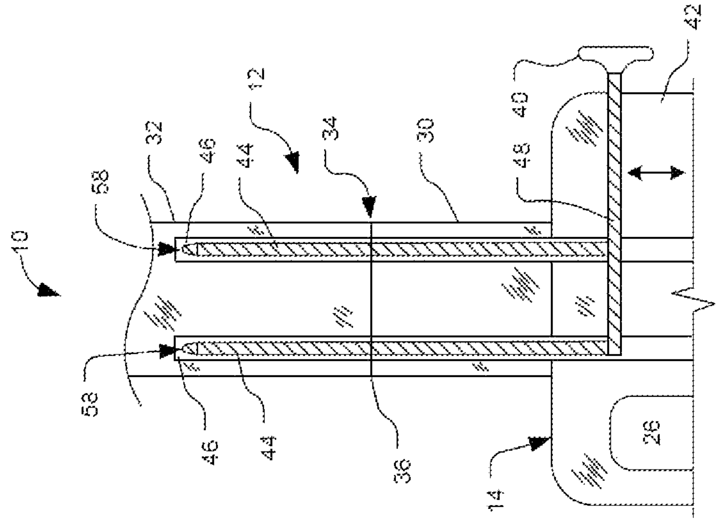
FIG. 5 is a top view of a section of a travel guitar of the type shown in FIG. 1, in partial cross section, illustrating a pair of translating truss rods of unitary construction positioned within recesses across a joint in the neck for the purpose of locking and providing rigidity to the upper and lower neck sections.

In one aspect shown in FIGS. 5-6, two translating truss rods 44 are provided, each of which is a unitary structure capable of being translated longitudinally within one or more passageways or recesses 46 formed in the upper neck portion 32 and/or lower neck portion 30. The translation takes place between a locked position shown in FIG. 5 and an unlocked position shown in FIG. 6, based on the selective movement by a user of the handle member 40 which is coupled to the truss rods 44 via a connecting rod 48 which traverses along track or groove 42 in the body 14. In the locked position (FIG. 5), each unitary truss rod 44 is disposed at least partially within both the lower neck portion 30 and upper neck portion 32, which locks the upper neck portion 32 in alignment with the lower neck portion 30. In the unlocked position (FIG. 6), each unitary truss rod 44 is disposed within the lower neck portion 30 and/or body 14, just as long as its removed from the upper neck portion 32 a sufficient distance from the hinge 36 (e.g. as shown in FIG. 6) such that the upper neck portion 32 may be folded into a reduced profile as shown in FIG. 4.

Figure 8:
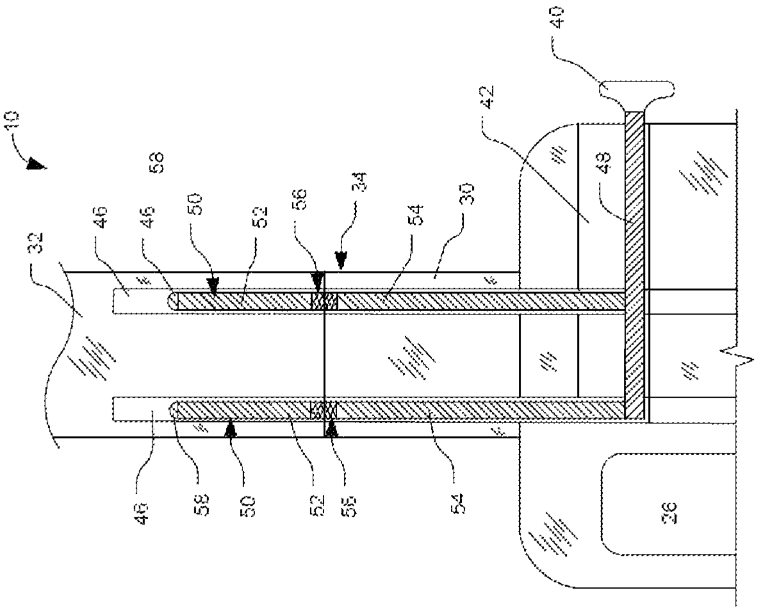
FIG. 8 is a top view of a section of a travel guitar of the type shown in FIG. 1, in partial cross section, illustrating a pair of translating truss rods of hinged construction positioned within recesses such that the hinge of each truss rod is aligned with the joint in the neck for the purpose of unlocking and folding the upper and lower neck sections.
Figure 7:
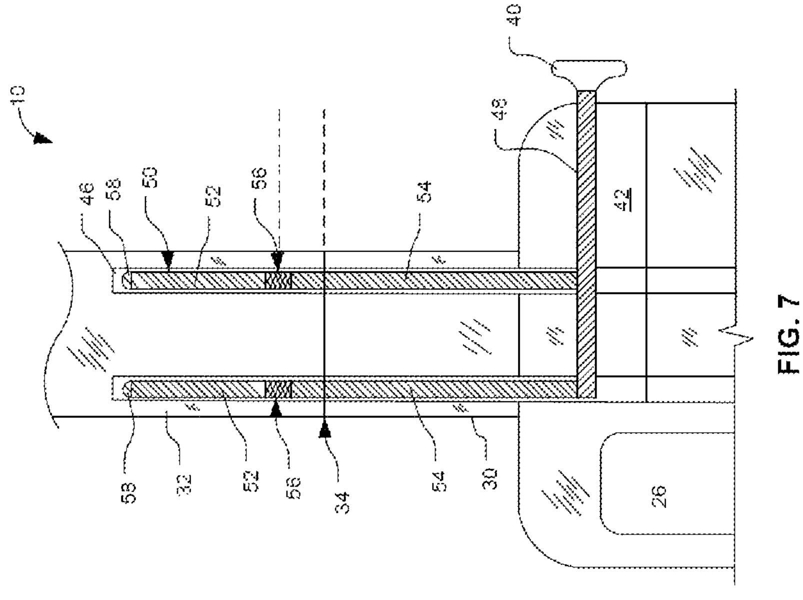
FIG. 7 is a top view of a section of a travel guitar of the type shown in FIG. 1, in partial cross section, illustrating a pair of translating truss rods of hinged construction positioned within recesses such that the hinge of each truss rod is not aligned with the joint in the neck for the purpose of locking and providing rigidity to the upper and lower neck sections.
Figure 9:
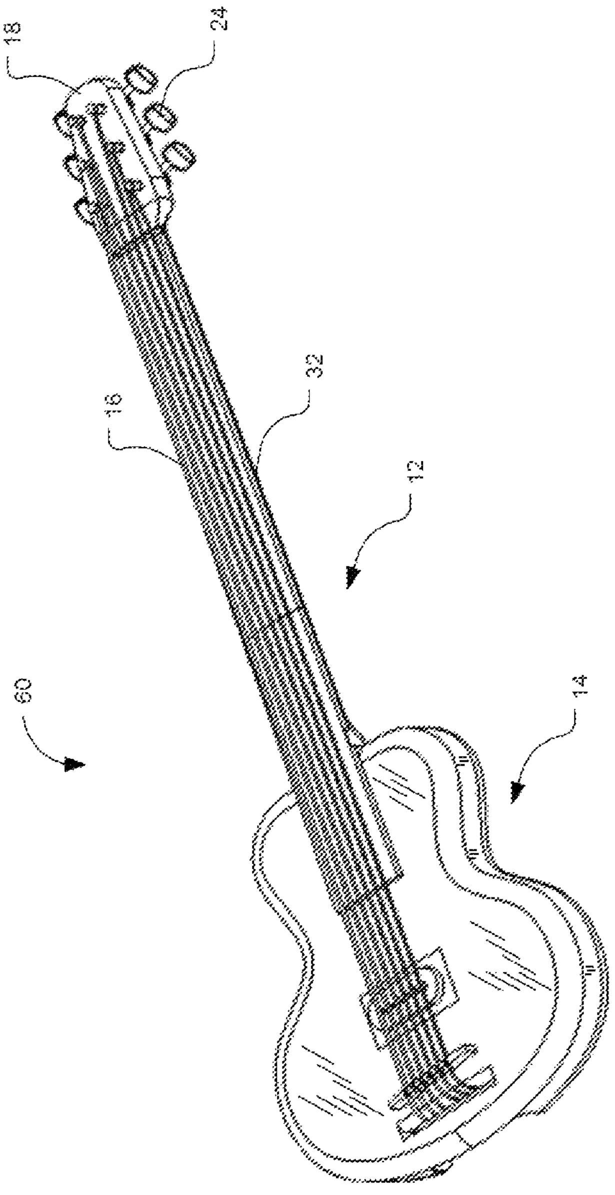
FIGS. 9-10 are top and bottom perspective views, respectively, of a travel guitar of a still further aspect in the playing or deployed position, with the neck configured to be foldable such that an upper portion of the neck folds away from a lower portion.
Figure 10:
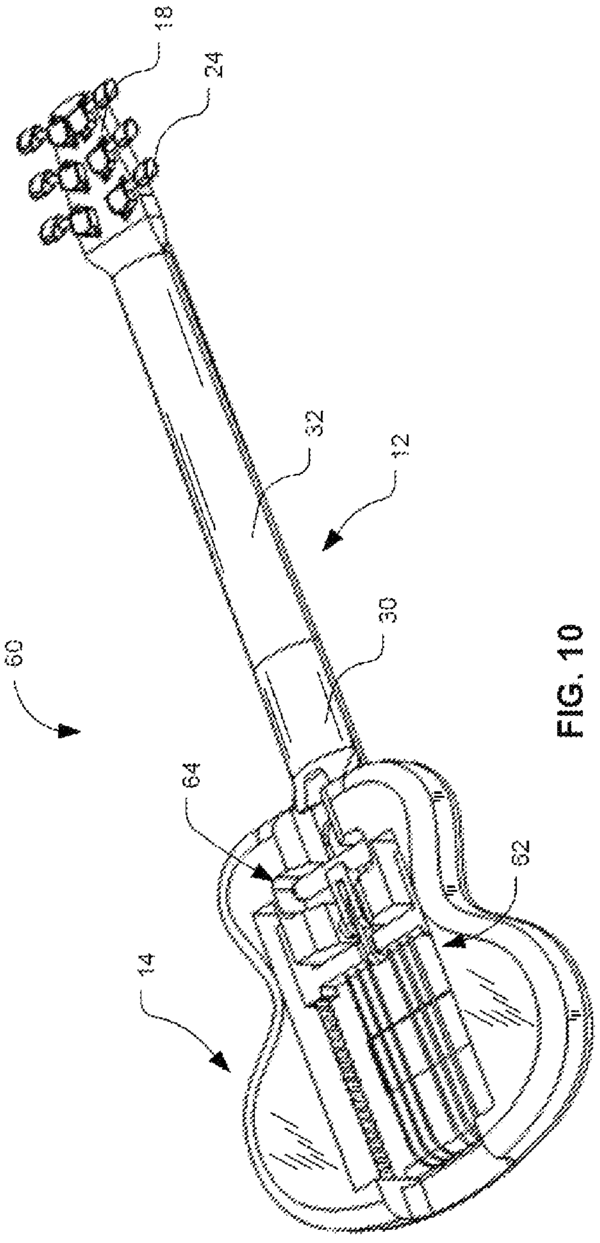
Figure 11:
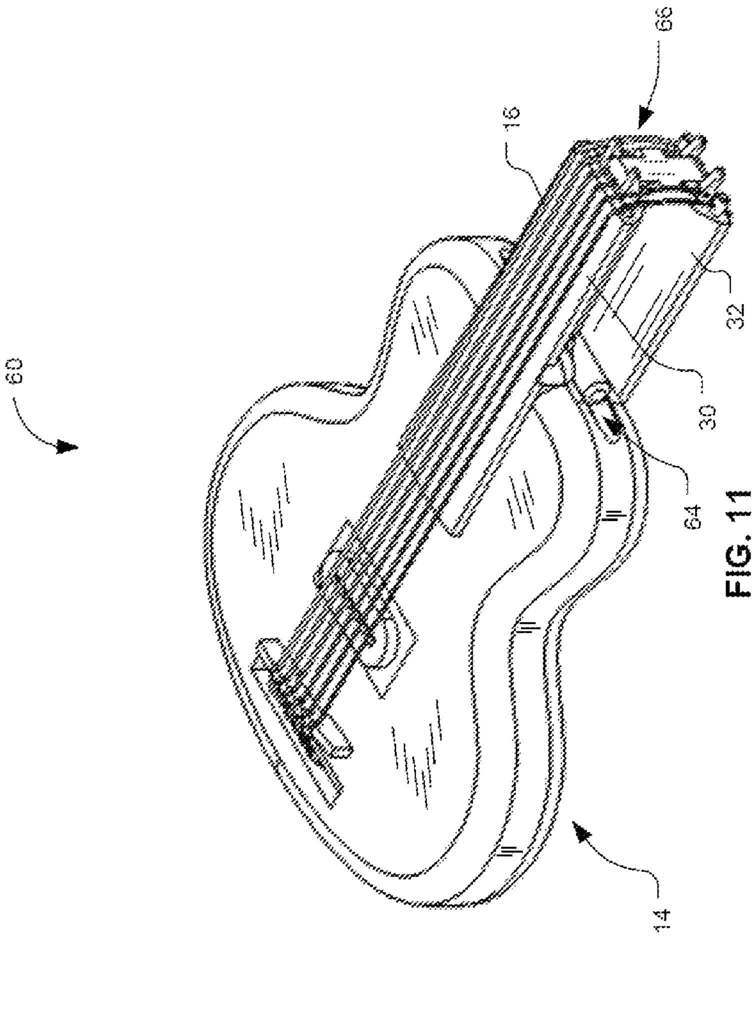
FIGS. 11-12 are top and bottom perspective views, respectively, of a travel guitar of the type shown in FIGS. 9-10 in the folded or undeployed position, with the upper portion of the neck folded away from the lower portion of the neck.
Figure 12:
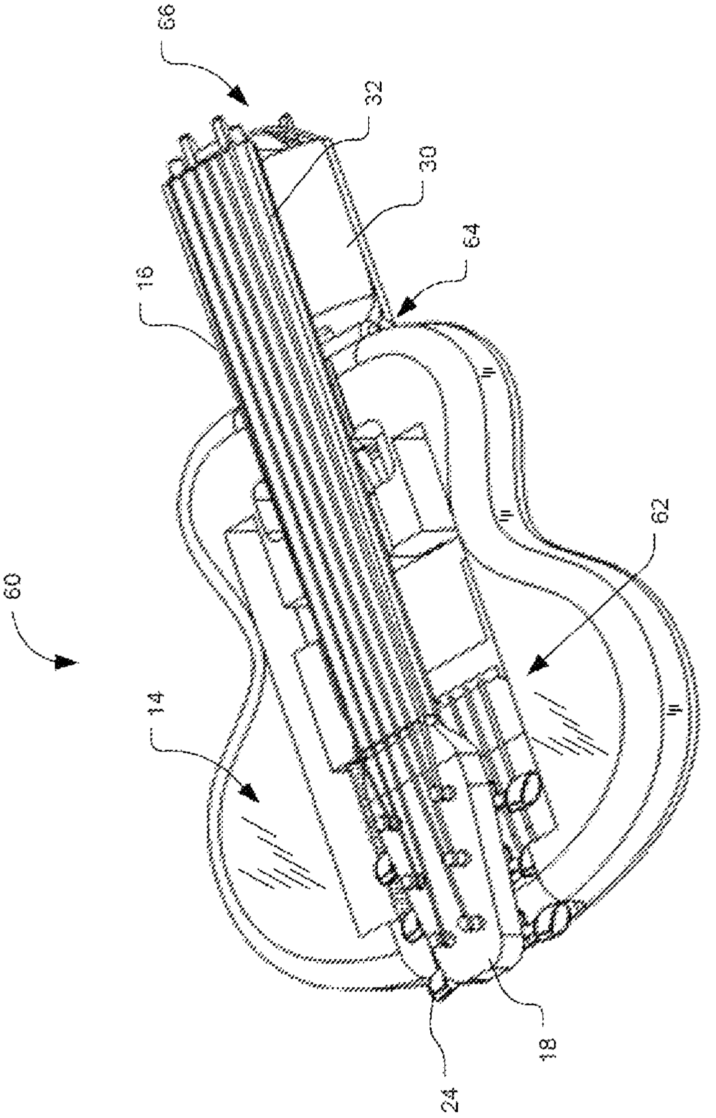
Figure 13:
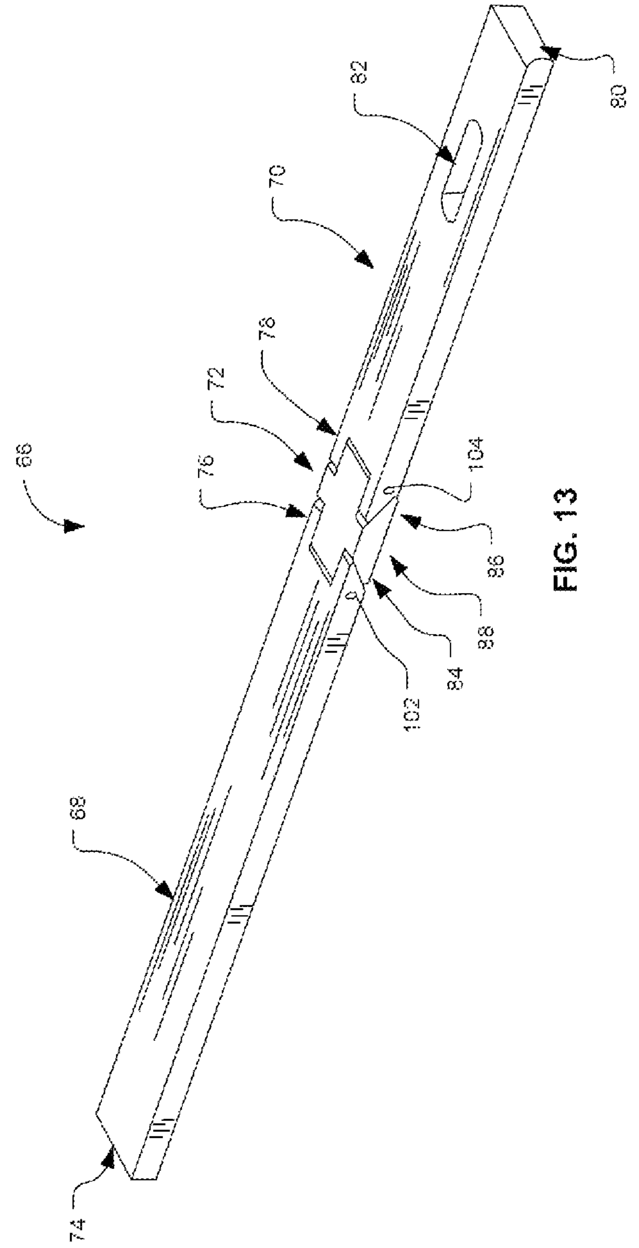
FIG. 13 is a perspective view of a hinged truss assembly of one aspect for use within the travel guitar of the type shown in FIGS. 9-10, dimensioned to provide a “one-way” hinge to allow folding away from the playing position.

In one aspect shown in FIGS. 7-8, two translating truss rods 50, each of which is a hinged structure capable of being translated longitudinally within one or more passageways or recesses 46 formed in the upper neck portion 32 and/or lower neck portion 30 between a locked position shown in FIG. 8 and an unlocked position shown in FIG. 9. Each truss rod 50 is constructed from a rigid upper portion 52 hingedly coupled to a rigid lower portion 54 coupled together by a hinge 56. In the locked position (FIG. 7), the upper portion 52 of each hinged truss rod 50 is disposed at least partially within the upper neck portion 32, the lower portion 54 of each hinged truss rod 50 is disposed at least partially within the lower neck portion 30, and the hinge or hinged section 56 is disposed within either the upper neck portion 32 or lower neck portion 30. By disposing the hinged portion 56 of the truss rod 50 in the upper neck portion 32 or lower neck portion 30, the truss rod 50 can no longer rotate about hinge 56 and thus has strength and rigidity characteristics similar to that of a unitary truss rod 44. In the unlocked position (FIG. 8), the upper portion 52 of each hinged truss rod 50 is disposed at least partially within the upper neck portion 32, the lower portion 54 of each hinged truss rod 50 is disposed at least partially within the lower neck portion 30, and the hinge or hinged section 56 is disposed at the approximate junction or joint 36 between the upper neck portion 32 and lower neck portion 30. By disposing the hinge or hinged section 56 of the truss rod 50 at the approximate junction or joint 36 between the upper neck section 32 and lower neck section 30, the upper neck section 32 may then be folded to assume a reduced profile (FIG. 4).

Each truss rod (unitary 44 or hinged 50) may be translated with or independent of the translating bridge assembly 20. If translated with the bridge assembly 20, each unitary truss rod 44 will be moved in the opposite direction as the bridge assembly 20, while each hinged truss rod 50 may be translated in the either the same or opposite direction as the bridge assembly 20. The translation of each truss rod (unitary 44 or hinged 50) may occur simultaneous with the translation of the bridge assembly 20 or slightly staggered in time. Staggering translation to assume a reduced profile first involves translating the bridge assembly 20 towards the neck 12 (FIG. 2 to FIG. 3) in order to reduce the tension of the guitar strings 16, followed by translating each truss rod 44/50 into the unlocked position (FIG. 2 to FIG. 3) such that the upper neck portion 32 may be folded away from the lower neck portion 30. Staggering translation during deployment of the travel guitar 10 first involves aligning the upper neck portion 32 and lower neck portion 30 (FIG. 4 to FIG. 3), translating each truss rod 44/50 into the locked position via the use of the handle 40 (FIG. 3 to FIG. 2), and then translating the bridge assembly 20 away from the neck 12 via the use of the handle 38 (FIG. 3 to FIG. 2) in order to increase the tension of the guitar strings 16 in preparation for tuning.

Each truss rod 44/50 may be constructed from any number of materials having properties sufficient to bolster the strength and rigidity of the neck 12 of the travel guitar 10, including but not limited to metal, carbon fiber, etc Each truss rod 44/50 may be manufactured having any number of solid cross-sectional shapes (e.g. circular, oval, triangular, etc. . . . ) and/or non-solid cross-sectional shapes (e.g. generally crescent-shaped, generally V-shaped, generally U-shaped, etc. . . . ). If constructed having a non-solid cross-sectional shape, the “open” side of the truss rod 44/50 may be disposed within the neck 12 so as to face generally towards the underside of the neck (versus towards the frets 22). This configuration will provide the greatest strength and rigidity for the truss rod 44/50 to resist the tendency of the neck 12 to bend under the tension of the guitar strings 16 after they have been tuned.

With reference to FIGS. 5-8, each truss rod 44/50 should preferably be equipped with a leading end 58 which is tapered or otherwise configured to facilitate introduction into the recess 46 of the upper neck section 32 during the process of deploying the travel guitar 10 for use. By providing such a tapered leading end 58, the upper neck portion 32 and lower neck portion 30 need not be perfectly aligned in order to begin to receive the truss rods 44/50. Rather, the tapered leading end 58 will be able to enter a non-perfectly aligned recess 46 of the upper neck portion 32. Once in this initial position, the truss rod 44/50 may thereafter be advanced more fully into the recesses 46, which will bring the recesses 46 (and thus upper neck section 32 and lower neck section 30) into co-alignment. It should be noted that the recesses 46 are shown having a larger diameter than the truss rod 44/50 in FIGS. 5-7 solely for the sake of delineating between the two structures in the interest of clarity. It will be appreciated, however, that the diameter of the recesses 46 and truss rods 44/50 may be much closer so as to ensure a snug fit between the two during full deployment, akin to that shown in FIG. 8.

FIGS. 9-31 illustrate a travel guitar 60 of yet another aspect of the present invention. The travel guitar 60 is similar to that shown and described above with reference to FIGS. 1-8 and can include any of the features and/or functions of that and/or any other aspect set forth in this disclosure. For example, although not shown, it will be appreciated that the smart phone 26 of FIGS. 1-8 can be included in or used with the travel guitar 60, such as by forming a recess in the body 14 or otherwise providing a connector to electrically couple a smart phone to the travel guitar for the purpose of aiding in the operation or use of the travel guitar (e.g. via training apps, tuning apps, effects apps, etc. . . . ). Based on the similarities, like features may use the same reference numerals as those set forth in FIGS. 1-8 and, in the interest of efficiency, a description and explanation of the common features from FIGS. 1-8 need not be repeated. Features that are not common with the travel guitar 10 of FIGS. 1-8 will described in detail below, including a translating bridge assembly 62, an actuation mechanism 64, and a hinged translating truss assembly 66.

Figure 14:
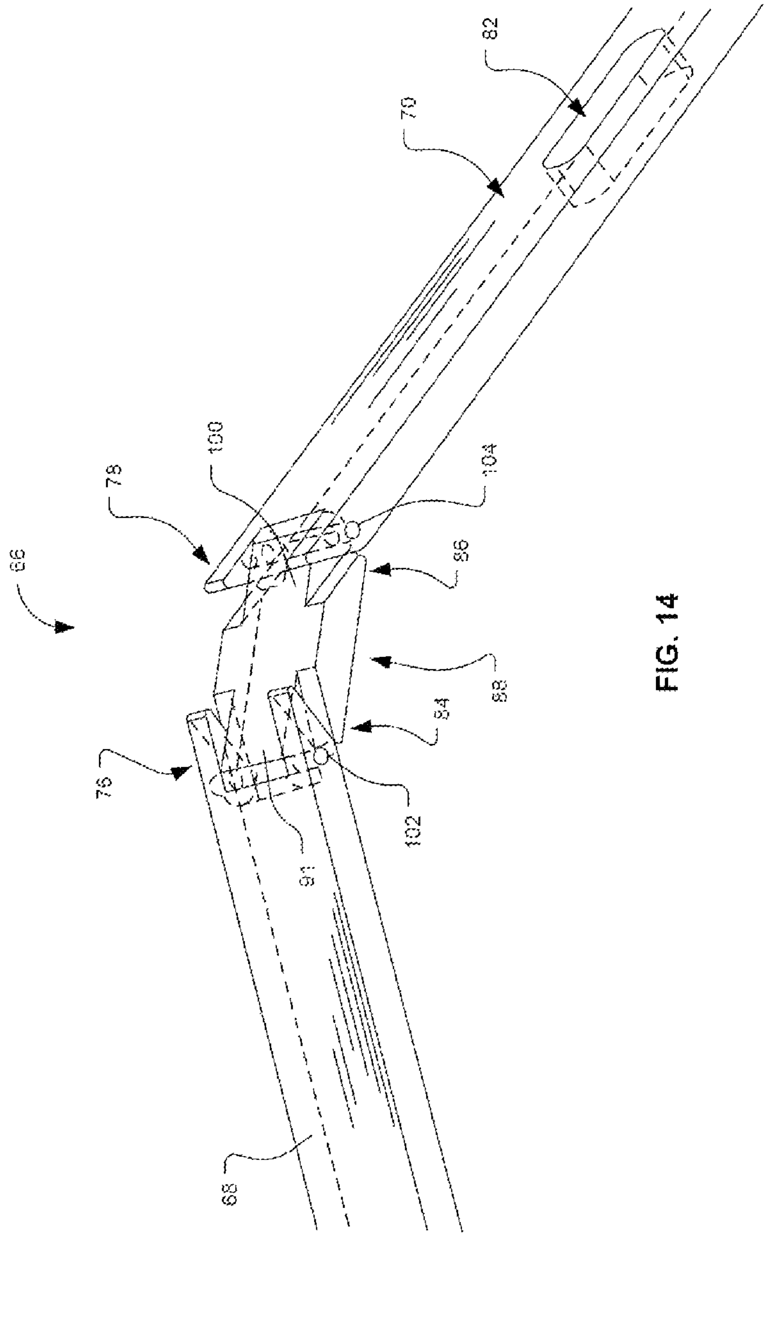
FIG. 14 is an enlarged view of a hinged region of the hinged truss assembly of the type shown in FIG. 13, further illustrating the “one-way” hinge functionality.
Figure 15:
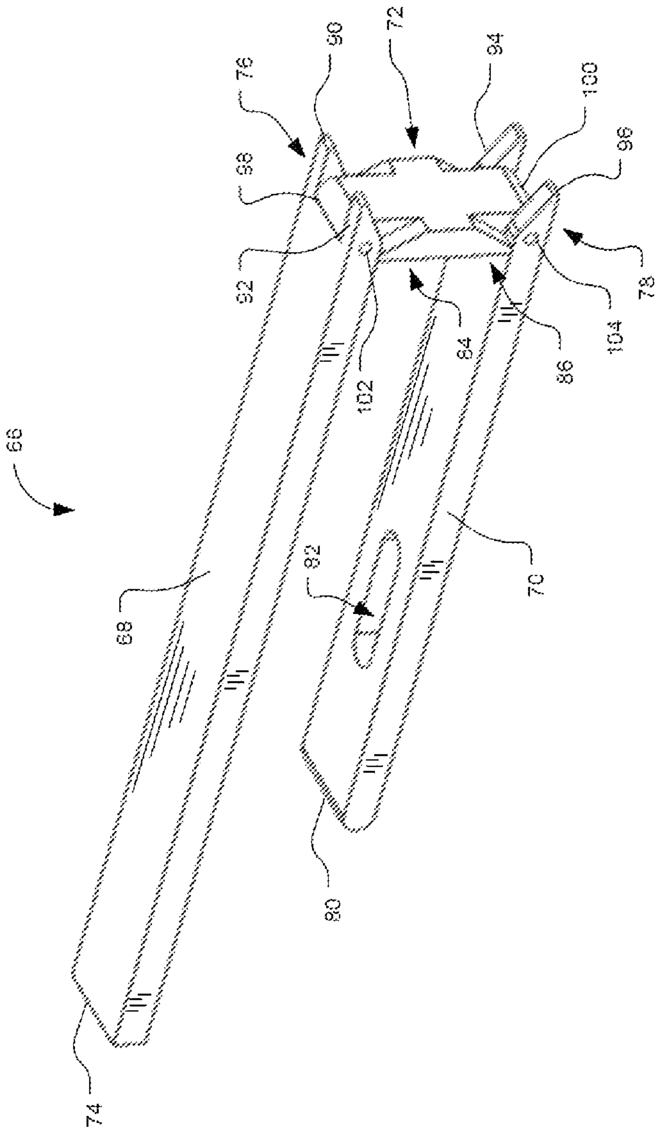
FIGS. 15-16 are perspective views of the hinged truss assembly of the type shown in FIG. 13 in the folded or undeployed position, with a first elongate section positioned generally parallel to a second elongate section with a middle section disposed generally perpendicular thereto.
Figure 16:
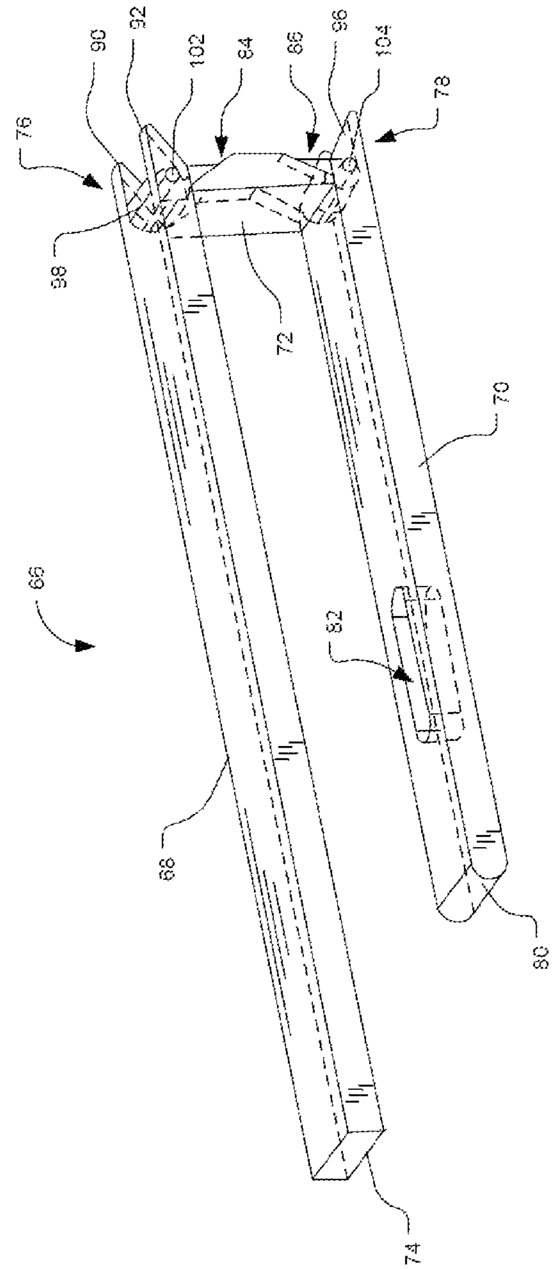

FIGS. 13-16 illustrate the hinged truss assembly 66 forming part of the travel guitar 60, which (as will be described below) allows the travel guitar 60 to be selectively configured into the playing position (shown in FIGS. 9-10) and the travel position (shown in FIGS. 11-12) according to an aspect of the present invention. The hinged truss assembly 66 includes a first elongate section 68, a second elongate section 70, and a middle section 72. The first elongate section 68 has a first end 74 and second end 76. The second elongate section 70 includes a first end 78, a second end 80, and an elongated aperture 82. The middle section 72 includes a first end region 84 and a second end region 86. The middle section 72 and the respective ends 76 and 78 of the first and second elongate sections 68, 70 define a hinge region shown generally at 88. As will be described in more detail below, the hinged connection enabled by the hinge region 88 allows the hinged truss assembly 66 to be positioned in the generally linear (unfolded) configuration shown in FIG. 13 and selectively folded as shown in FIGS. 14-16.

More specifically, with reference to FIGS. 15-16, the second end 76 of the first elongate section 68 includes a pair of arms 90, 92 defining a space there between and each including a flat upper surface and an angled lower surface dimensioned to cooperate with a respective angled surface of the first end 84 of the middle section 72. In similar fashion, the first end 78 of the second elongate section 70 includes a pair of arms 94, 96 defining a space there between and each including a flat upper surface and an angled lower surface dimensioned to cooperate with a respective angled surface of the second end 86 of the middle section 72. The middle section 72 includes a first extension 98 (forming part of the first end 84) and a second extension 100 (forming part of the second end 86). The first and second extensions 98, 100 extend beyond the angled surfaces of the first and second ends 84, 86, respectively, and each include a cylindrical aperture dimensioned to receive a first hinge pin 102 and a second hinge pin 104, respectively. The hinged truss assembly 66 thus provides a "one-way" hinge connection between the first elongate section 68 and second elongate section 70, meaning the second end 80 of the second elongate section 70 can only be moved in a roughly clockwise manner towards the first end 74 of the first elongate section 68 as shown in FIGS. 13-16. When disposed in the generally linear configuration shown in FIG. 13, the angled surfaces of the hinged region 88 prevent any counterclockwise movement and thus maintain each section 68, 70, 72 of the hinged truss assembly 66 in general alignment.

Figure 17:
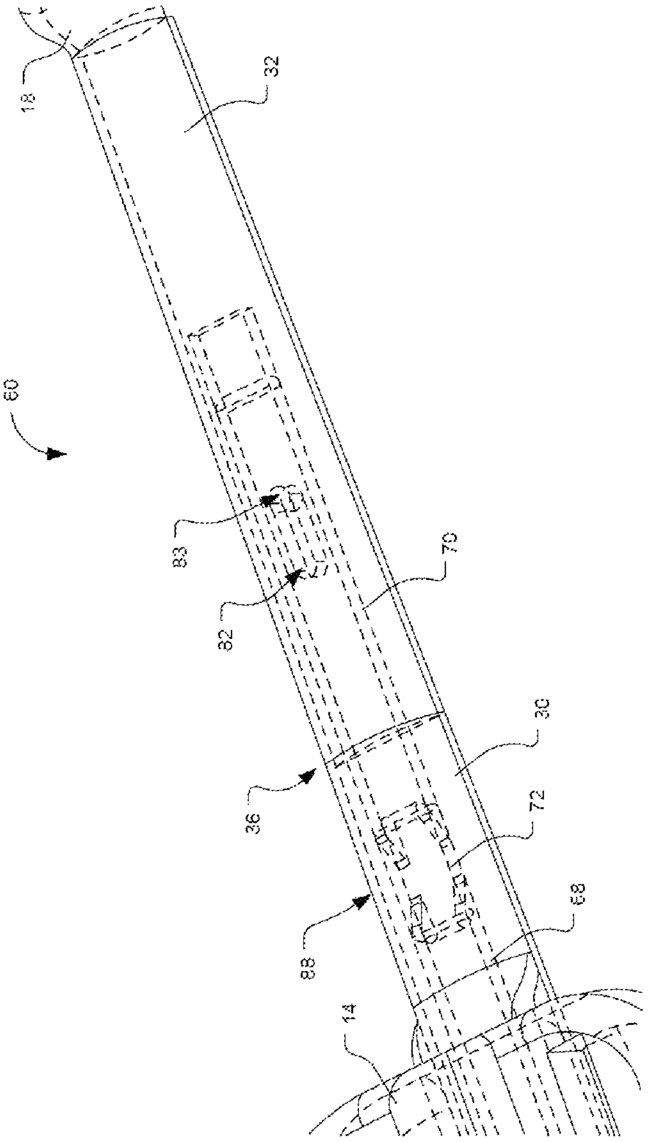
FIG. 17 is an enlarged bottom perspective view of the travel guitar of the type shown in FIGS. 9-10 in the playing or deployed position, with the hinged truss assembly of the type shown in FIGS. 13-16 shown in phantom.
Figure 18:
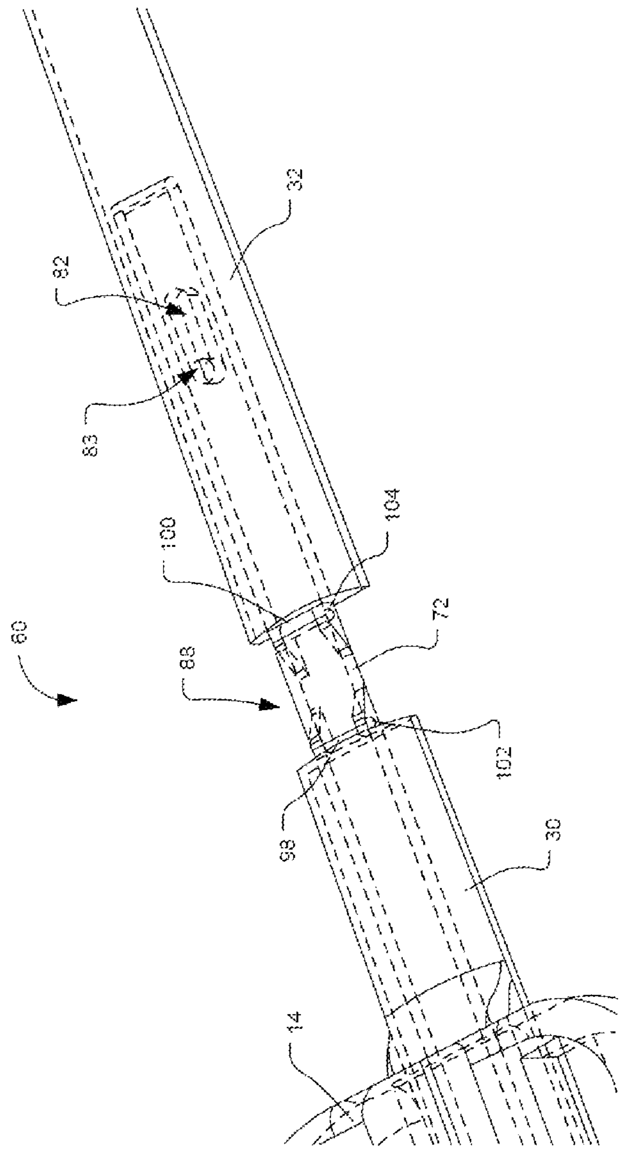
FIG. 18 is an enlarged bottom perspective view of the travel guitar of the type shown in FIGS. 9-10 during the step of moving the upper neck portion away from the lower neck portion to avail a hinged region of the truss assembly of the type shown in FIGS. 13-16 according to one aspect.

As best shown in FIGS. 17-18, the hinged truss assembly 66 is positioned within corresponding recesses within the neck 12 and body 14 of the travel guitar 60. More specifically, when the travel guitar 60 is in the playing position (see FIGS. 9-10 and 17), the hinged truss assembly 66 is positioned such that the first elongate section 68 resides partially in the body 14 and lower neck portion 30, the middle section 72 resides wholly within the lower neck portion 30, and the second elongate section 70 resides partially in the lower neck portion 30 and upper neck portion 32. The "one-way" hinge construction of the hinged truss assembly 66 maintains the upper neck portion 32 in alignment with the lower neck portion 30 to ensure proper string height for desired action and playability. The aperture 82 within the second elongate section 70 cooperates with a pin 83 disposed in fixed relation within the upper neck section 32. The pin 83 is positioned in a generally perpendicular manner relative to the surface of the neck 12 and has a diameter slightly less than the width of the aperture 82 in order to enable the translation of the pin 83 within the aperture 82.

The cooperation of the pin 83 within the elongated aperture 82 aids with securing the travel guitar 60 in the playing or deployed position, as well as transitioning the travel guitar 60 into the undeployed or travel/storage position. The actuation mechanism 64 (to be described in greater detail below) is physically coupled to the first elongated member 68 of the translating truss assembly 66 such that operation of the actuation mechanism 64 serves to translate or move the hinged truss assembly 66 within the recesses of the neck 12 and body 14. As shown in FIG. 17, when the travel guitar 60 is in playing or deployed position, the pin 83 is in physical contact with the end of the aperture 82 nearest the head 18, which serves to keep the upper neck section 32 in flush and robust contact with the lower neck section 30. This flush and robust contact may be augmented by the forces applied by actuation mechanism 64 (to be described in greater detail below) as well as tuning the strings 16.

In order to transition the travel guitar 60 into the folded position, the upper neck portion 32 must be moved away from the lower neck portion 30 in order to avail the hinged region 88 of the translating truss assembly 66 as shown in FIG. 18. As will be described below, the first step in transitioning the travel guitar 60 into the folded state involves releasing the actuation assembly 64 in order to unlock the translating bridge assembly 62 and thereby detension the strings 16. With the strings 16 detensioned, the actuation mechanism 64 may thereafter be used to translate or move the hinged truss assembly 66 within the recesses of the neck 12 and body 14 in the direction of the head 18. This translation initially causes the pin 83 to move from the location shown in FIG. 17 (in contact with the end of the elongated aperture 82 closest to the head 18) until the pin 83 makes contact with the opposite end of the elongated aperture 82. From this point, the continued longitudinal translation of the truss assembly 66 towards the head 18 (via the actuation mechanism 64) will cause the upper neck section 32 to move away from the lower neck section 30. This will avail the hinged region 88 (including hinged middle section 72) and thus allow the travel guitar 60 to be moved from the playing position (FIGS. 9-10) into the travel or storage position (FIGS. 11-12) according to the folding functionality of the travel guitar 60.

Figure 24:
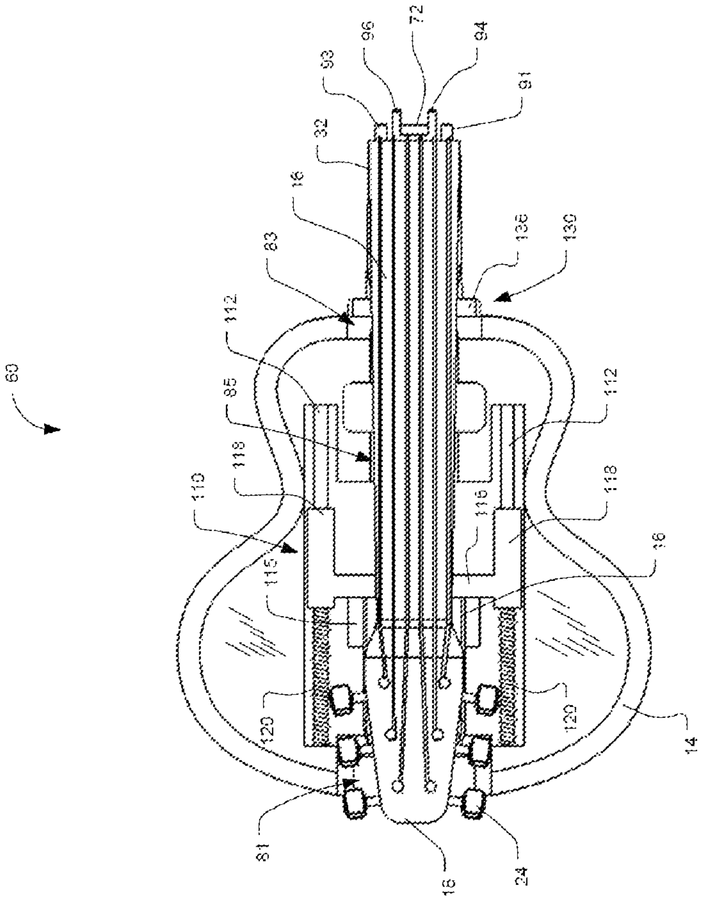
Figure 25:
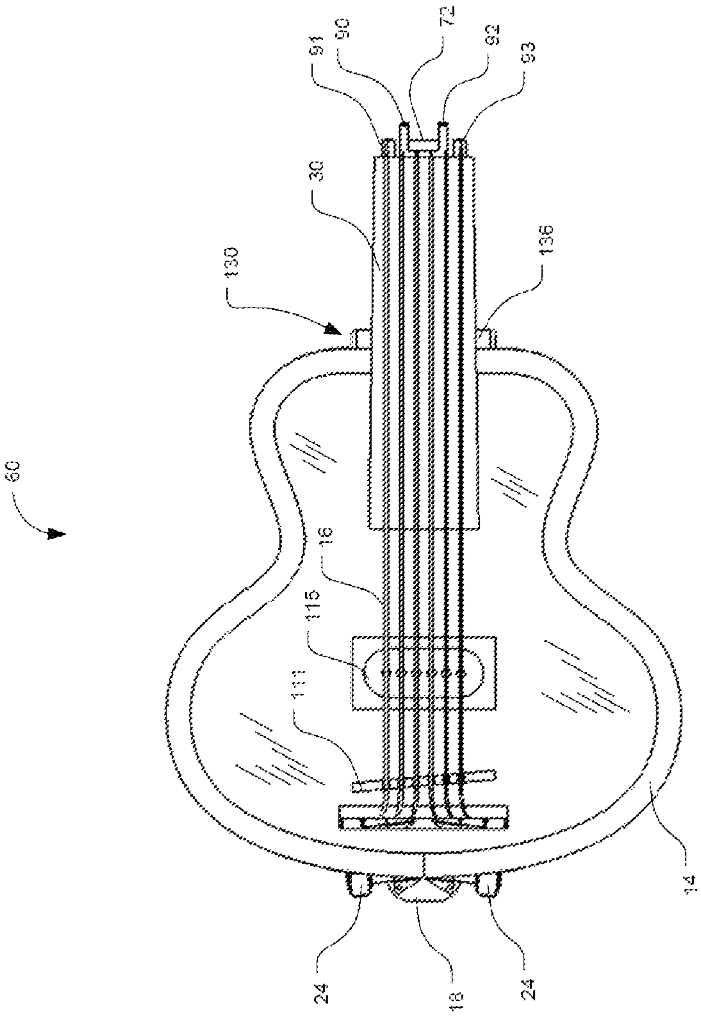
FIG. 25 is a top view of the top or upperside of the travel guitar of the type shown in FIGS. 9-10 in a fully folded or undeployed state.
Figure 26:
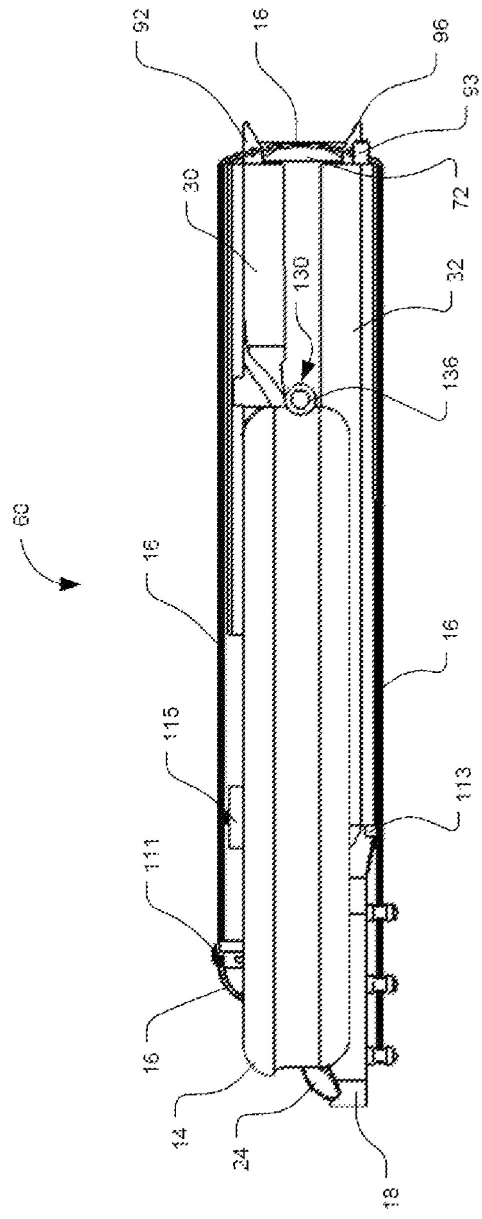
FIG. 26 is a side view of the travel guitar shown in FIG. 25.

Referring to FIGS. 19-33, the translating bridge assembly 62 includes a bridge member 110 capable of translating or moving along a pair of rods 112, wherein both the bridge member 110 and rods 112 are disposed within a recess 114 formed in the bottom surface of the body 14 of the travel guitar 60. As best shown in FIG. 24, the bridge member 110 has a generally H-shaped design with a cross-bar 116 extending between a pair of elongate sections 118 which are co-planar with and generally perpendicular to the cross-bar 116. The cross-bar 116 is configured to terminally couple one end of each of the strings 16 to the bridge element 110. The elongate sections 118 are configured to slide or otherwise translate along the rods 112. This may be accomplished, for example, by forming longitudinal apertures in the elongate sections 118 which are co-linear with the rods 112 and dimensioned to slide along the rods 112 if longitudinal forces are applied to the bridge element 110. As will be explained in greater detail below, longitudinal forces may be applied to the bridge element 110 via the actuation mechanism 64, the tension applied to the strings 16 by the tuning machines 24, as well as springs 120 disposed along the exterior of the rods 112.

Figure 27:
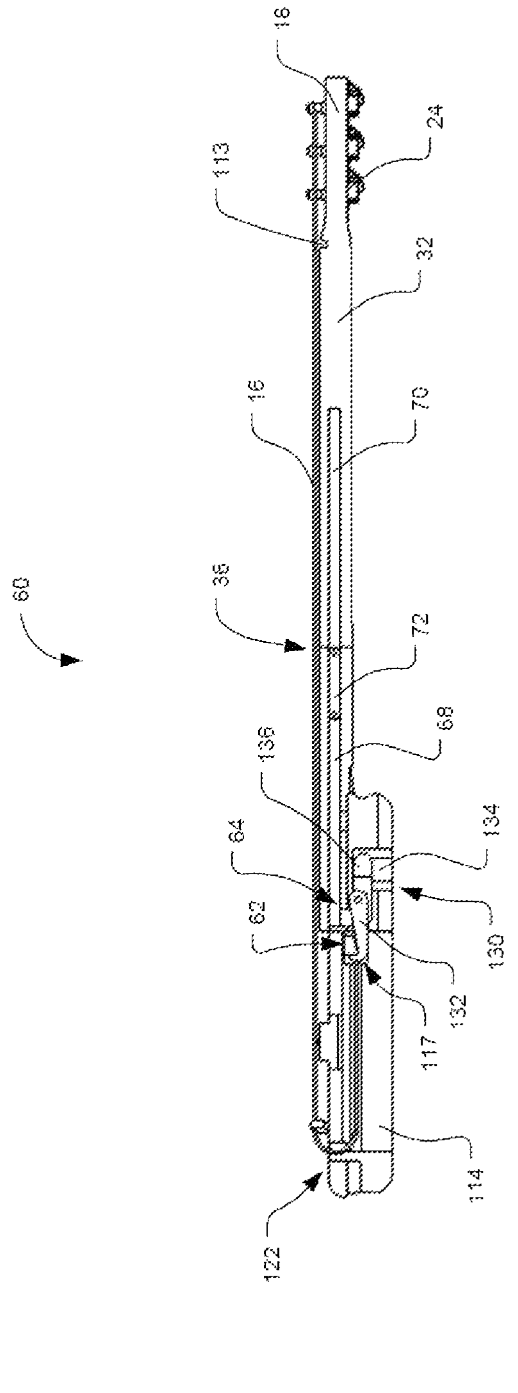
FIG. 27 is a side view of the travel guitar of the type shown in FIGS. 9-10 in the fully deployed and playing state with the latch-type actuation mechanism in the fully locked state as shown in perspective in FIG. 19.
Figure 28:
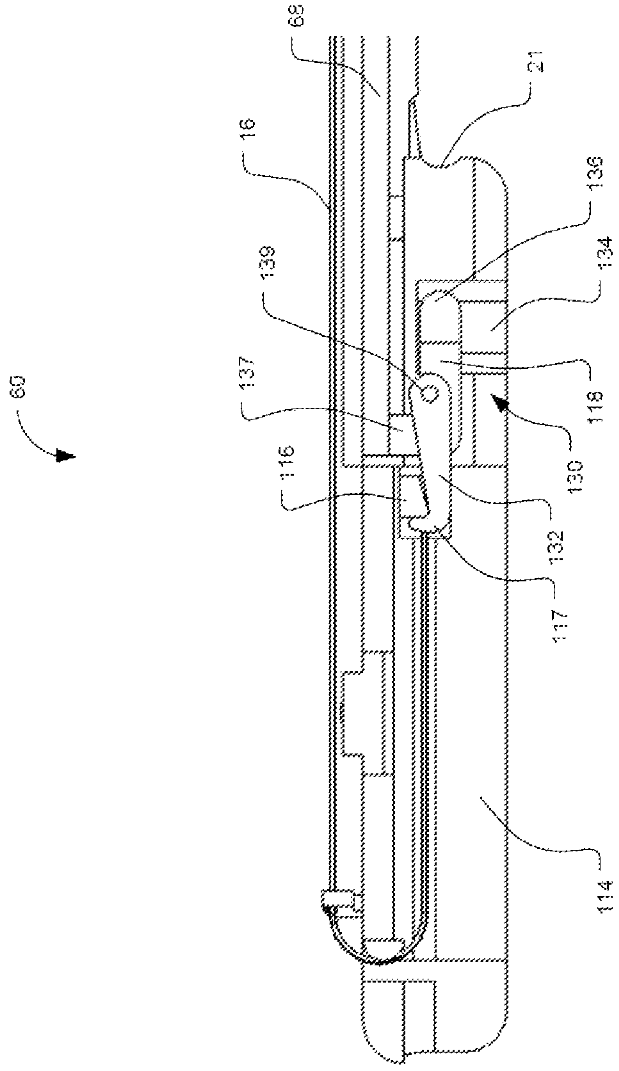
FIG. 28 is an enlarged, partial side view of the travel guitar shown in FIG. 27 in the fully deployed and playing state with the latch-type actuation mechanism in the fully locked state as shown in a perspective view in FIG. 19.
Figure 29:
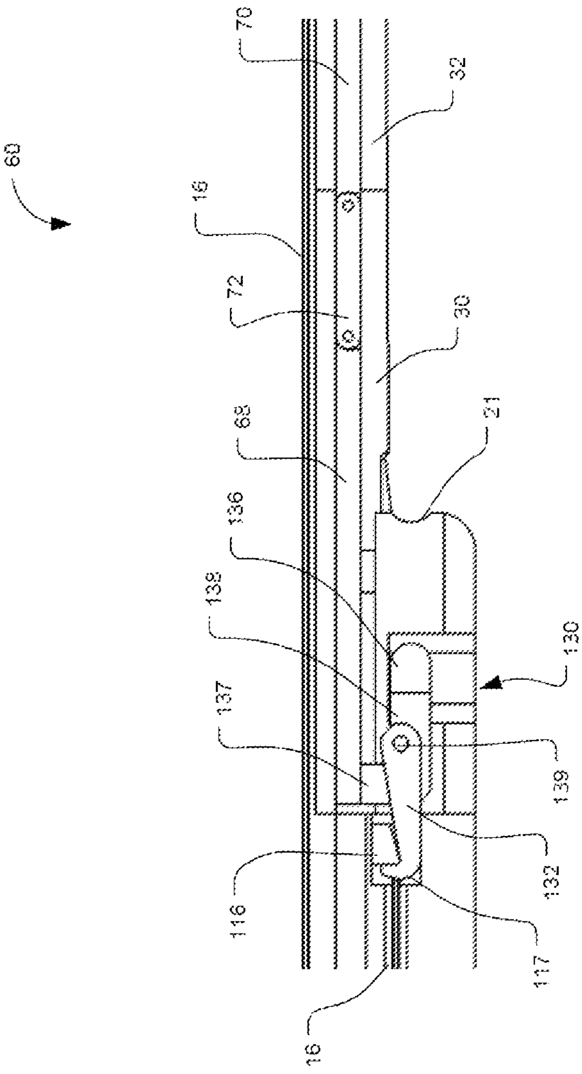
FIG. 29 is an enlarged, partial side view of the travel guitar shown in FIG. 27 in the fully deployed and playing state with the latch-type actuation mechanism in the fully locked state as shown in perspective view in FIG. 19.

As best shown in FIGS. 27-28, the strings 16 extend rearward from the cross-bar 116 of the bridge element 110 within the main recess in the underside of the body 14 before passing through a slotted aperture 122 formed near the end of the body 14 in order to route the strings 16 to the upper surface of the travel guitar 60. The slotted aperture 122 is equipped with a rounded element or surface 124 (which may be a static, immovable element or a cylindrical roller) in order to facilitate the reversal in direction of the strings 16 towards the head 18 of the neck 12 (for coupling to the tuning machines 24) and also prevent or minimize kinking or other damage to the guitar strings 16 during the translation of the strings 16 as part of the operation of the travel guitar 60 (e.g. the tensioning and detensioning of the strings 16 to enable playing and folding, respectively). The strings 16 proceed from the slotted aperture 122 and continue onward over a saddle member 111 mounted or formed on the upper surface of the body 14, over a nut element 113 disposed at the junction of the upper neck section 32 and head 18, and onward to the tuning machines 24 on the head 18.

The height of the saddle 111 and/or nut 113 may be selected (or adjusted) in order to ensure a desired clearance of the strings 16 over the frets (not shown) disposed along the upper surface of the neck 12 as well as a pick-up 115 mounted to or formed within the upper surface of the body 14. The clearance of the strings 16 influences the so-called "action" of the strings 16 and overall playability of the travel guitar 60. The adjustment of the height of the saddle 111, nut 113 and/or frets on the neck portions 30, 32 may be manual or accomplished via servo motors (not shown) disposed in the guitar 60 to selectively or automatically achieve a desired string height or action.

Figure 19:
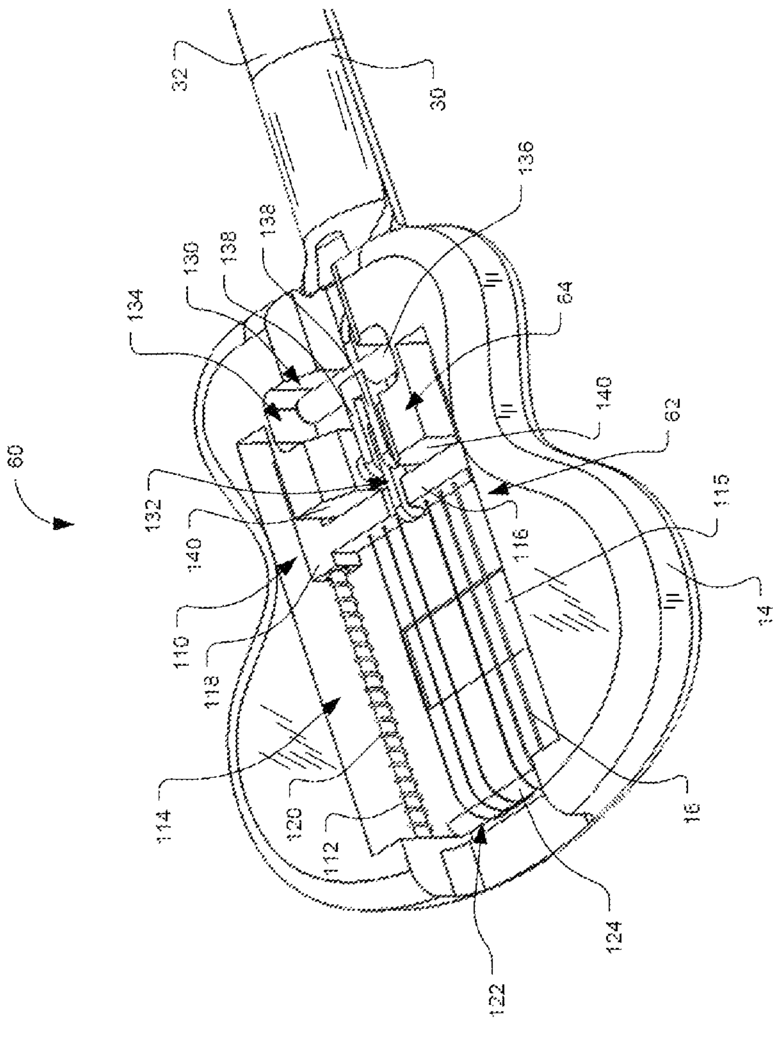
FIG. 19 is a partial perspective view of the bottom of the travel guitar of the type shown in FIGS. 9-10 illustrating a latch-based actuation mechanism of one aspect in a fully locked state with the travel guitar in the deployed or playing position.

The actuation mechanism 64 is of latch-based construction including a handle structure 130 and a latch member 132, wherein both the handle structure 130 and latch member 132 are disposed within the various recesses (e.g. recess 114, recess 134, etc. . . . ) formed in the underside of the body 14 when the travel guitar 60 is in the playing or unfolded configuration (see FIG. 19). The handle structure 130 includes a grip member 136 and a pair of arms 138. The grip member 136 extends generally perpendicularly from the pair of arms 138, which are spaced apart and extend generally parallel to the longitudinal axis of the travel guitar 60. As best viewed in FIG. 30, the arms 138 of the handle structure 130 are rotatably coupled to the first elongate member 68, specifically via a pin or axel 135 that extends perpendicularly through apertures formed in the arms 138 and corresponding aperture(s) (not shown) in an arm or structure 137 extending from the bottom surface of the first elongate member 68 of the translating truss assembly 66. The latch member 132 is rotatably coupled to the handle assembly 130, specifically via a pin or axel 139 that extends perpendicularly through apertures formed in the latch member 132 and corresponding apertures (not shown) in the arms 138 of the handle assembly 130 (again, as best viewed in FIG. 30). In operation, the latch member 132 is configured to translate along the longitudinal axis of the travel guitar 60 and rotate about the pin or axel 139 based on the rotational position of the grip member 136 about the pin or axel 135.

The actuation mechanism 64 is designed to perform two main functions. The first is to lock or unlock the bridge element 110 relative to the body 14 of the travel guitar 60. When the bridge element 110 is locked relative to the body 14 (see FIG. 19), the strings 16 may then be tensioned via the tuning machines 24 to tune the strings 16 for playing. When the bridge element 110 is unlocked relative to the body 14 (see FIGS. 20-21), the bridge element 110 will translate away from the locked position and thus lower the tension on the strings 16. As will be described in greater detail below, according to one aspect the bridge element 110 is dimensioned to translate a sufficient distance upon being unlocked by the actuation mechanism 64 such that the strings 16 will drop from a fully tuned state (typically well over 100 pounds of force) to a largely detensioned state (ranging, for example, between 2 and 7 pounds of force). The second main function of the actuation mechanism 64 is to facilitate moving the upper neck section 32 away from the lower neck section 30 after the strings 16 have been sufficiently detensioned in order to avail the hinge region 88 (e.g. middle section 72) of the translating truss assembly 66 such that the travel guitar 60 may be transitioned into the folded or reduced profile state.

FIGS. 19 and 27-29 show the travel guitar 60 in the deployed or playing position with the actuation mechanism 64 in a fully locked state. The grip member 136 of the handle structure 130 is disposed within the recess 134 formed in the underside of the body 14. The latch 132 includes a curved or hooked end 117 (best viewed in FIG. 28-29) capable of being brought into mechanical contact with the rearward facing surface of the cross-bar 116 of the bridge element 110. The latch-based actuation mechanism 64 is configured such that the mechanical advantage will maintain the cross-bar 116 of the bridge element 110 in close proximity to (if not flush with) the rearward facing surfaces 140 forming part of the interior of the recess 114 of the body 14. This mechanical configuration helps ensure the bridge element 110 will be locked and immovable when the travel guitar 60 is in the playing or deployed position, which will aid in maintaining the desired string tension for prolonged tuning and playing.

Figure 20:
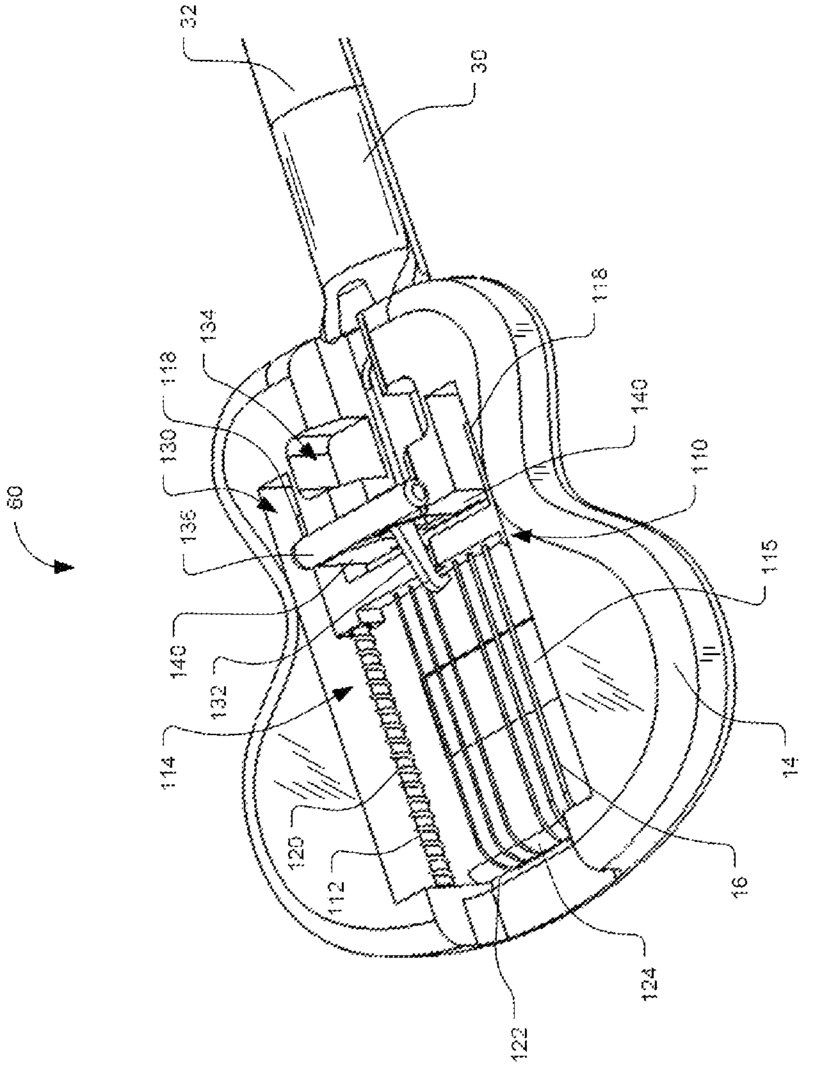
FIG. 20 is a partial perspective view of the travel guitar of the type shown in FIGS. 9-10 in in the deployed position with the latch-based actuation mechanism in a partially unlocked state.
Figure 30:
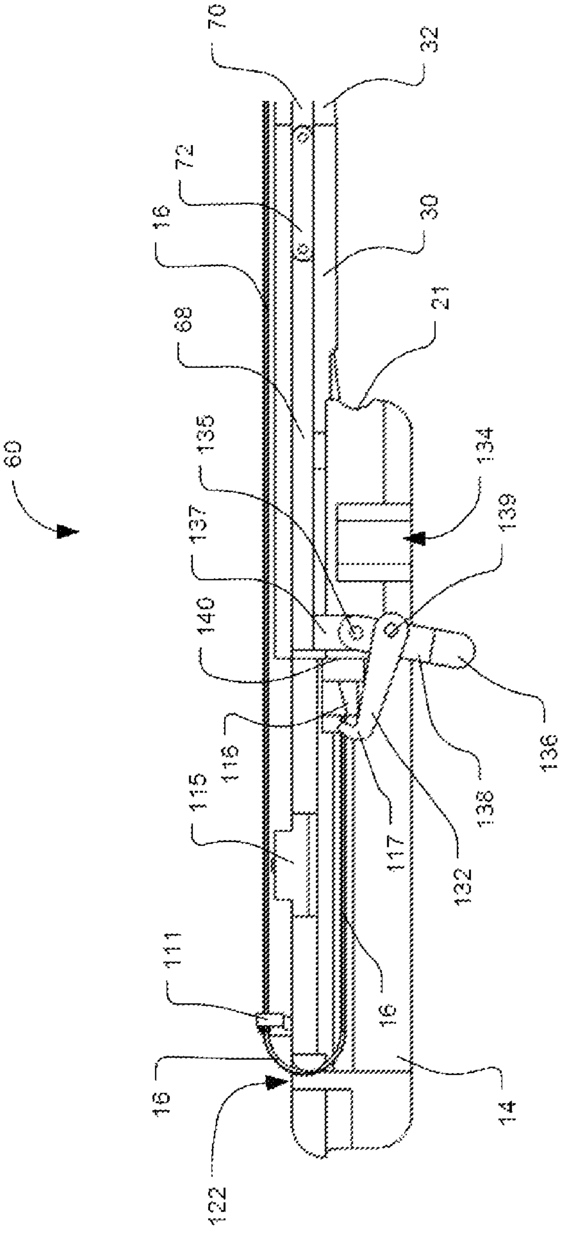
FIG. 30 is an enlarged, partial side view of the travel guitar shown in FIG. 27 in the fully deployed but non-playing state with the latch-type actuation mechanism in the partially unlocked state as shown in perspective view in FIG. 20.

FIGS. 20 and 30 show the travel guitar 60 in in the deployed position with the actuation mechanism 64 in a partially unlocked state. This is accomplished by having the user grasp the grip member 136 while in the locked state (see FIG. 19) and thereafter rotate the grip member 136 about pin or axel 135 towards the rear of the body 14. Due to the coupling of the latch member 132 to the arms 138 of the handle structure via pin or axel 139, the act of rotating the grip member 136 in this fashion causes the latch member 132 to translate in the same direction, that is, towards the rear of the body 14. This initial translation of the latch member 132 thus allows the cross-bar 116 of the bridge element 110 to translate or move towards the rear of the body 14, in part based on the tension on the strings 16 by virtue of having been in the tuned or fully tensioned state while in the playing position (FIG. 19) immediately prior to rotating the grip member 136. In one aspect, the translation of the bridge element 110 in this manner serves to quickly shift the strings 16 from the fully tensioned state (e.g. well over 100 pounds) to the detensioned state (e.g. range of 2-7 pounds). The distance the bridge element 110 needs to move in order to achieve this quick detensioning of the strings 16 may vary depending upon a host of factors, but in one aspect may be in the range of between 0.5 to 3 inches. At this point, the latch member 132 may be rotated about pin or axel 139 to fully release the bridge element 110 from the actuation mechanism 64. The bridge element 110 will thereafter be subject to the countervailing forces of the strings 16 (pulling towards the rear of the body 14) and the compression springs 120 disposed along the rods 112.

Figure 21:
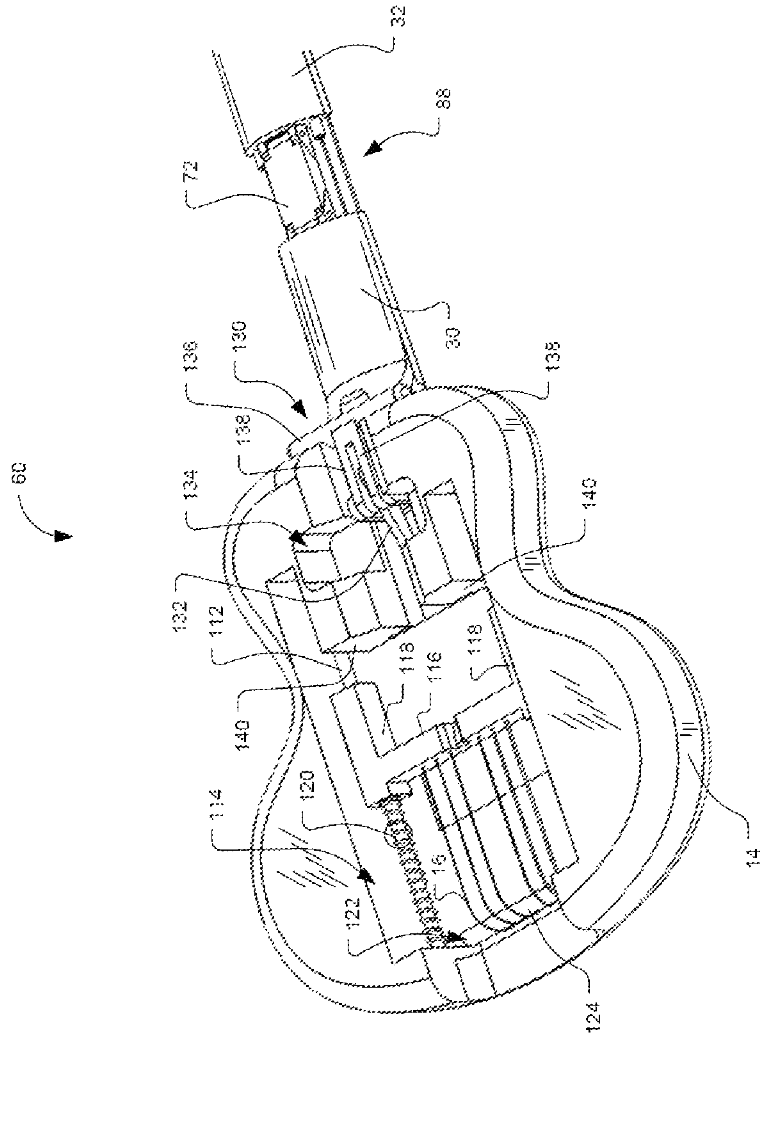
FIG. 21 is a partial perspective view of the bottom of the travel guitar of the type shown in FIGS. 9-10 illustrating the latch-based actuation mechanism in a fully unlocked and extended state to avail a hinged region of the translating truss assembly to enable folding the travel guitar according to one aspect.
Figure 31:
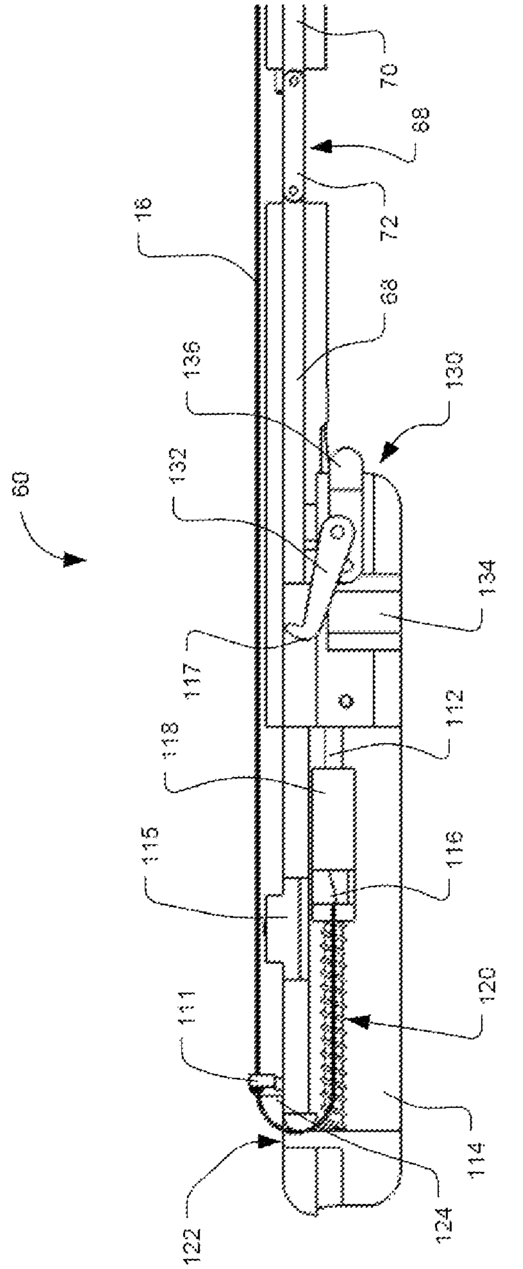
FIG. 31 is an enlarged, partial side view of the travel guitar shown in FIG. 27 with the neck in the extended state with the latch-type actuation mechanism in the fully unlocked and extended state as shown in perspective view in FIG. 21.

FIGS. 21 and 31 show the travel guitar 60 with the actuation mechanism 64 fully unlocked from the bridge element 110 with the upper neck portion 32 extended away from the lower neck portion 30 to avail the hinged region 88 of the translating truss assembly 66. This is accomplished by having the user grasp the grip member 136 (after the latch 132 has been fully released from the bridge element 110) and move or translate the grip member 136 towards the front end of the body 14. As described above, the arms 138 of the handle structure 130 are coupled to the first elongate member 68 of the translating truss assembly 66. Based on this, the translation or movement of the grip member 136 towards the front end of the body 14 serves to translate or move the truss assembly 66 in the same direction. The initial movement of the grip member 136 in this manner causes the truss assembly 66 to translate within the recesses of the lower and upper neck portions 30, 32 from the location shown in FIG. 17 (with the pin 83 located at one end of the elongated aperture 82) until the pin 83 is located at the opposite end of the elongated aperture 82. This initial movement also moves the middle section 72 of the translating truss assembly 66 to a location adjacent to the junction 36 between the lower and upper neck portions 30, 32.

At this point, the user must continue to advance the grip member 136 towards the front end of the body 14. This secondary movement will cause the upper neck portion 32 to separate from the lower neck portion 30 to avail the hinged region 88 and middle element 72 of the translating truss assembly 66. Both the initial movement and secondary movement of the translating truss assembly 66 serve to indirectly act upon the springs 120 disposed on the rods 112 of the translating bridge assembly 62. The initial movement (where the pin 83 translates from one end of the elongated aperture 82 to the other) applies modest force to the strings 16, which may or may not cause the springs 120 to noticeably or materially compress or shorten. The secondary movement (where the hinged region 88 is availed between the lower and upper neck portions 30, 32), on the other hand, will apply a higher amount of force on the strings 16 because of the resultant movement of the head 18 coupled to the upper neck portion 32 due to the pin 83 acting against the end of the elongated aperture 82 as shown in FIG. 18. This secondary movement will thus cause physical compression or shortening of the springs 120 as shown in FIGS. 21 and 31.

After the secondary movement of the translating truss assembly 66 has been accomplished, and the hinged region 88 has been availed or exposed between the lower and upper neck portions 30, 32, the user may then rotate the grip member 136 past the end of the body 14 such that the grip member 136 is received within a forward-facing groove 21 (best viewed in FIGS. 28-29) formed in the front end of the body 14. The grip member 136 will be maintained in this position by virtue of the concave shape of the groove 21, along with the forces being applied in a rearward direction (that is, pulling towards the back end of the body 14) by virtue of the compression springs 120 which maintain a baseline tension on the strings 16 after the actuation mechanism 64 has been unlocked from the translating bridge element 110. Maintaining a baseline amount of tension on the strings 16 is an important feature in so-called "string management" because it prevents the strings 16 from becoming displaced away from the lower and upper neck portions 30, 32 both during and after the folding of the travel guitar 60 according to the present invention. In one aspect, the baseline tension applied to the strings 16 may range from 1 to 5 pounds of force.

Figure 22:
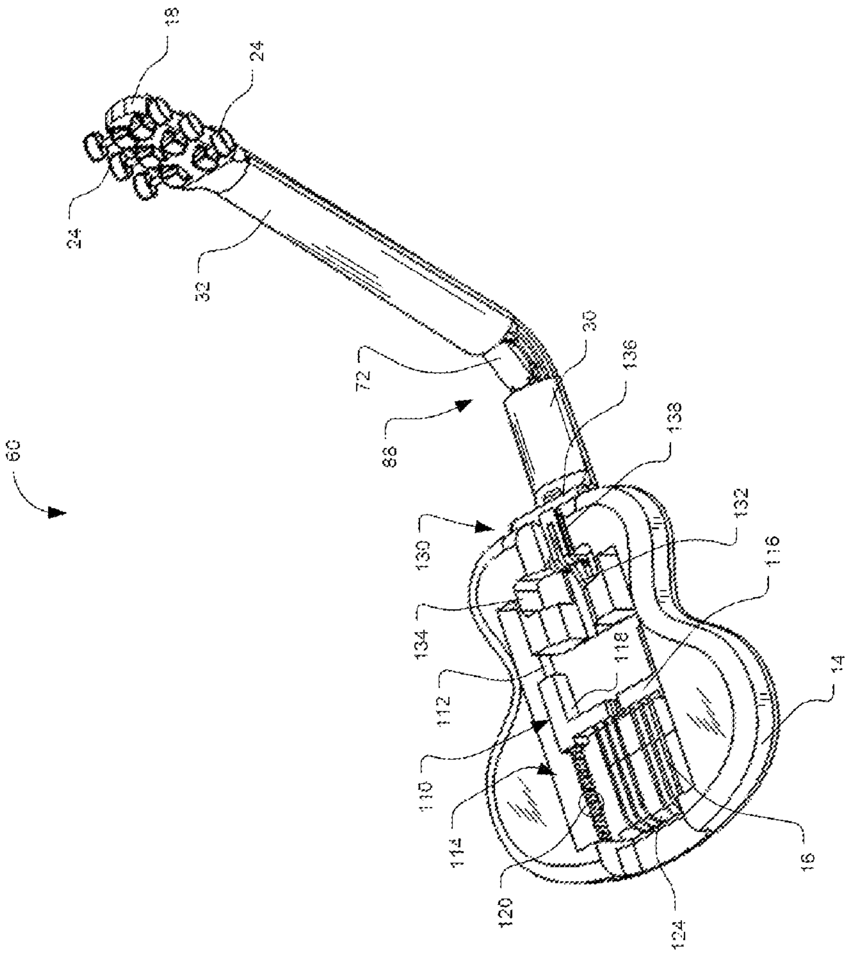
FIG. 22 is a perspective view of the bottom of the travel guitar of the type shown in FIGS. 9-10 illustrating the step of folding the upper neck portion away from the playing position (rotating counter-clockwise as shown in FIG. 22)
Figure 23:
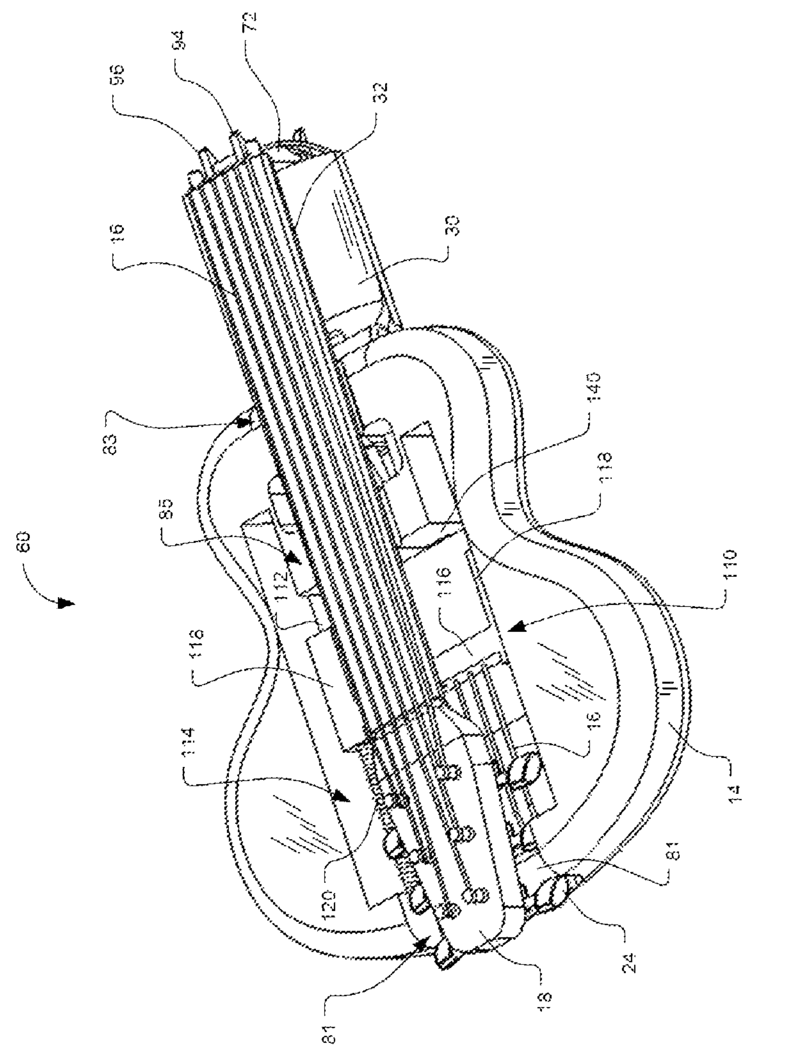
FIGS. 23-24 are perspective and top views, respectively, of the bottom or underside of the travel guitar of the type shown in FIGS. 9-10 in a fully folded or undeployed state.
Figure 32:
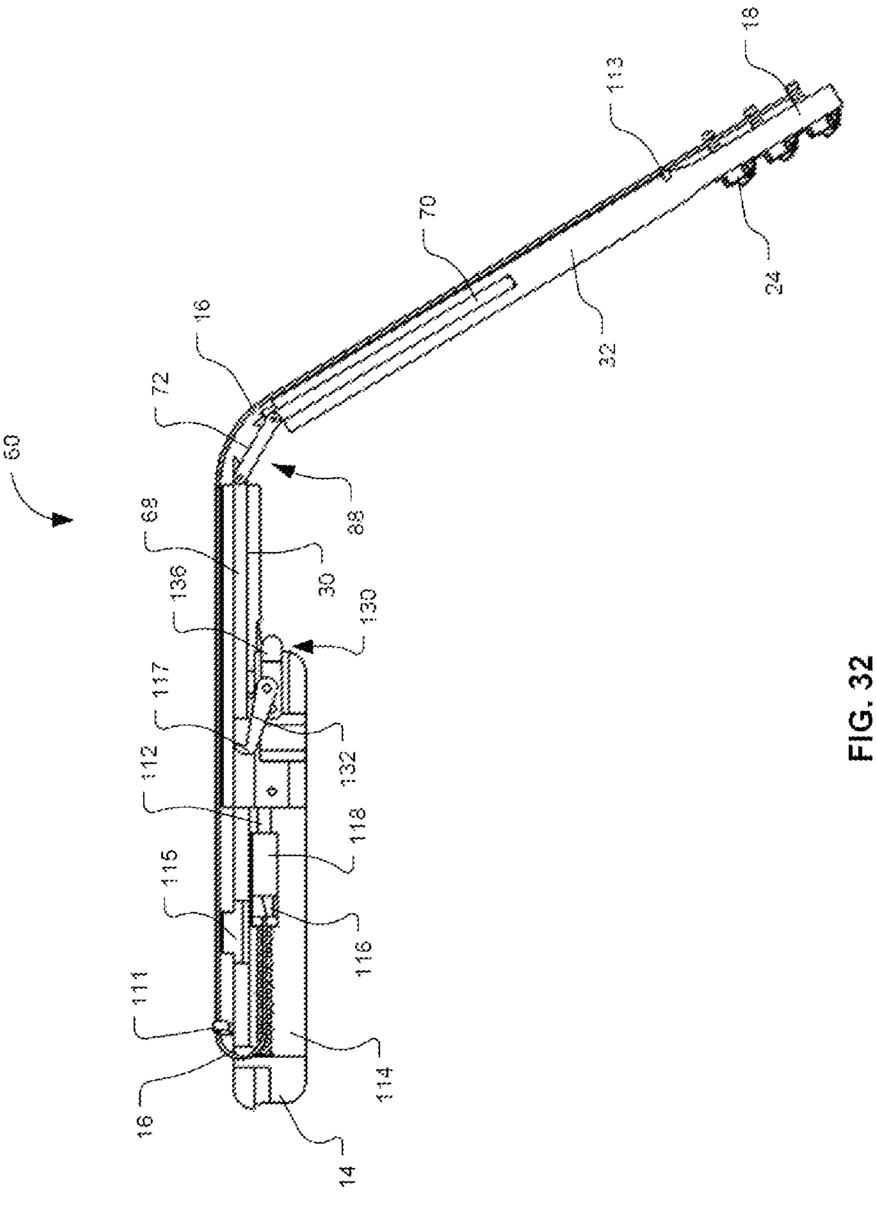
FIG. 32 is an enlarged, partial side view of the travel guitar shown in FIG. 27 in the partially folded state with the latch-type actuation mechanism in the fully unlocked and extended state as shown in perspective view in FIG. 22.
Figure 33:
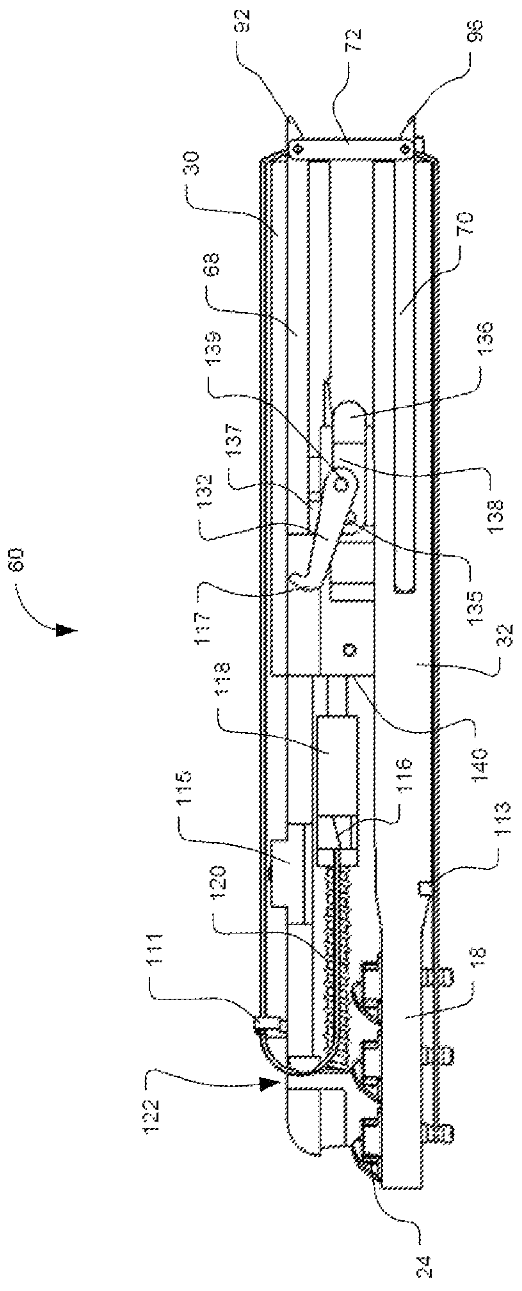
FIG. 33 is a side view of the travel guitar shown in FIG. 27 in the fully folded or undeployed state with the latch-type actuation mechanism in the fully unlocked and extended state as shown in FIGS. 23-25.

FIGS. 22 and 32 show the travel guitar 60 during the step of folding the upper neck portion 32 away from the playing position according to one aspect. With the grip member 136 of the handle structure 130 secured within the front-facing groove 21 of the body 14, the upper neck portion 32 may then be rotated out of linear alignment with the lower neck portion 30. Based on the "one way" hinged construction of the translating truss assembly 66, the upper neck portion 32 may only be rotated away from the playing position (i.e. counter-clockwise in FIG. 22 and clockwise in FIG. 32). As the upper neck portion 32 is in the process of being folded, the bending of the strings 16 may cause the tension of the strings 16 to increase, which will be counteracted by the compression springs 120 of the translating bridge assembly 62. As described above, having this baseline tension on the strings 16 helps with string-management because it helps prevent the strings 16 from meandering away from the lower or upper neck portions 30, 32, which may otherwise occur if tension were to be removed altogether from the strings 16 (e.g. such as may be the case if the upper neck portion 32 folded into the playing position, that is, opposite of that shown in FIGS. 22 and 32). The feature of folding the upper neck portion 32 away from the playing position also aids in string management because it helps maintain the strings 16 generally adjacent to and aligned with the lower and upper neck portions 30, 32.

FIGS. 23-26 and 33 show the travel guitar 60 in a fully folded or undeployed state. As will be appreciated, the travel guitar 60 has a compact, low profile while in the folded state. This compact, low profile is based largely due to the relatively short length (especially as compared to the unfolded or deployed state) as well as nesting functionality. The relatively short length is due to the fact the travel guitar 60 is folded about the approximate midpoint of the overall length of the travel guitar 60 while in the unfolded or playing position. As best viewed in FIGS. 23 and 24, this results in the upper neck portion 32 being positioned such that the end of the head 18 extends to the same approximate location as the back end of the body 14 (for little or no overhang). In one aspect, the length of the travel guitar 60 in the folded or undeployed state may range from 15 inches to 17 inches.

The nesting functionality serves to minimize the height profile of the travel guitar 60 while in the folded or undeployed state. As best viewed in FIGS. 26 and 33, the upper neck portion 32 is generally parallel to the lower neck portion 30 with a modest gap there between by virtue of the length of the middle element 72 of the translating truss assembly 66 (which enables folding the upper neck portion 32). To mitigate the impact of this gap, the upper neck portion 32 and head 18 are partially nested or recessed manner within the body 14. More specifically, with reference to FIGS. 23 and 24, the underside of the body 14 is provided with a nesting recess 81 near the back end of the body 14, which is dimensioned to accommodate and receive aspects of the head 18 and tuning machines 24. In similar fashion, additional nesting recesses are provided for accommodating aspects of the curved underside of the upper neck portion 32, namely, nesting recess 83 formed near the front end of the underside of the body 14 and nesting recess 85 formed in structure disposed nearer the middle of the underside of the body 14. In one aspect, the height of the travel guitar 60 in the fully folded or undeployed may range from 2 inches to 3 inches.

Based on the string-management features described above (e.g. baseline tension on strings 16 due to springs 120 of translating bridge assembly 62 after actuation mechanism 64 is unlocked, "one-way" folding away from the playing position, etc. . . . ), the strings 16 remain in place while the travel guitar 60 is in the folded or undeployed state. Various features located at or near the ends of the lower and upper neck portions 30, 32 may also help string-management during the folding process and while the travel guitar 60 is in the folded or undeployed state. More specifically, as best viewed in FIGS. 24 and 25, the pair of arms 94, 96 in the second elongate element 70 of the translating truss assembly 66 and the pair of arms 90, 92 in the first elongate element 68 of the translating truss assembly 66 all extend a slight horizontal distance past the middle element 72. Each of these pairs of arms 90, 92 and 94, 96 forms a barrier that, although not shown, is capable of retaining at least two (2) and possibly more of the six (6) strings 16 therebetween during and/or after the folding process. A pair of pins 91, 93 may be provided extending from the end of the upper neck portion 32 for the purpose of engaging into corresponding apertures (not shown) formed in the lower neck portion 30. The pair of pins 91, 93 extending from the upper neck portion 32 form a barrier that, although not shown, is capable of retaining at least one (1) and possibly more of the six (6) strings 16 there between during and/or after the folding process. Although not shown, the pins 91, 93 may include grooves or other features formed therein for the purpose of receiving one or more strings 16 during and/or after the folding process. Grooves may also be provided along the edge of the lower and upper neck portions 30, 32 to help maintain the strings 16 in proper position during and/or after the folding process.

Any of a variety of changes modifications may be undertaken to the travel guitar 60 without departing from the scope of the invention. For example, with reference to FIGS. 34 to 38, the actuation mechanism 64 may be of bolt-action design having a bolt element 150 coupled to a boss 152. The bolt element 150 includes a ball-ended grip member 154 and an extension arm 156 connected to the boss 152. The boss 152 is rotatably operable about the longitudinal axis of the travel guitar 60 and extends rearwardly from a housing fixedly coupled to the first elongate element 68 of the translating truss assembly 66. The boss 152 may be equipped with one or more features for selectively engaging and disengaging from the cross-bar 116 of the translating bridge element 110, such as (by way of example only) a threaded region (not shown) capable of threading with and unthreading from one or more threads formed or disposed on a raised lip or wall 158 disposed on the cross-bar 116 (best viewed in FIG. 36).

Figure 34:
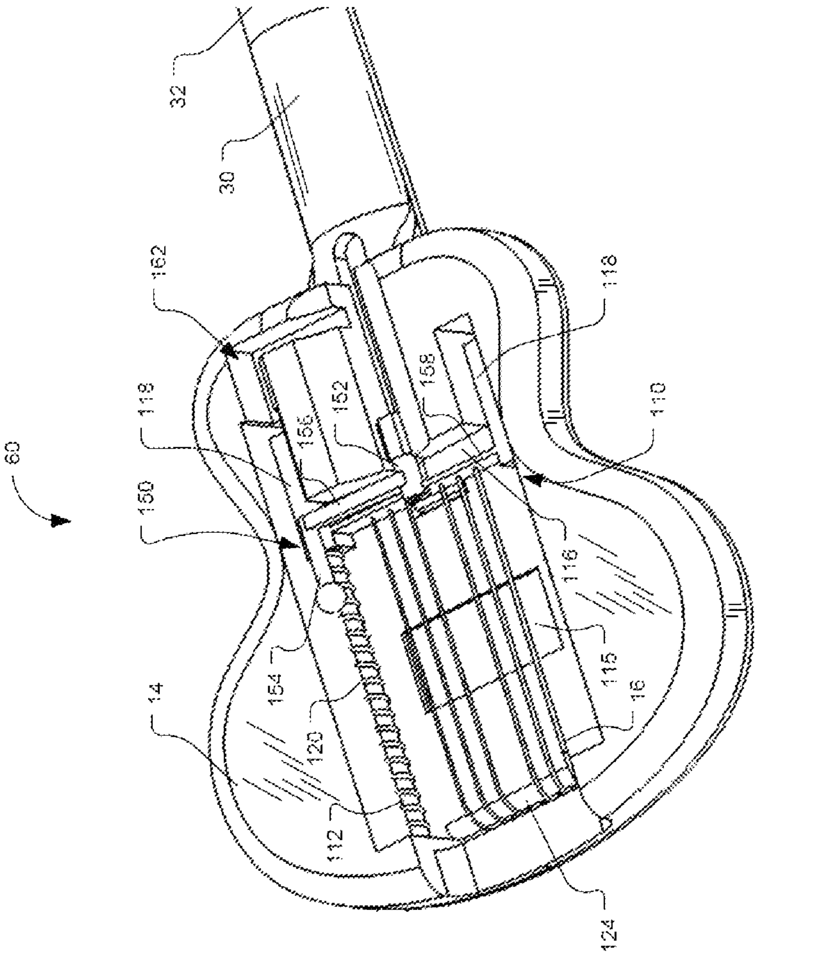
FIG. 34 is a partial perspective view of the bottom of the travel guitar of the type shown in FIGS. 9-10 except with a bolt-action actuation mechanism of one aspect in a fully locked state with the travel guitar in the deployed or playing position.
Figure 35:
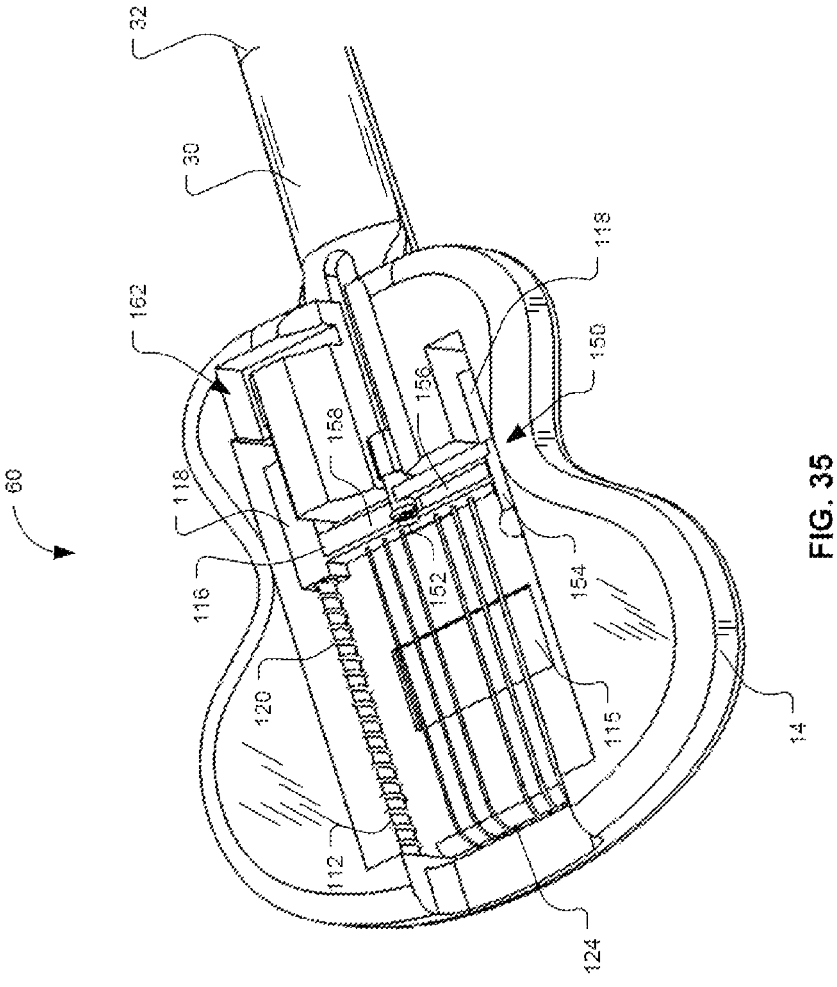
FIG. 35 is a partial perspective view of the bottom of the travel guitar of the type shown in FIGS. 9-10 except with a bolt-action actuation mechanism in a unlocked state with the travel guitar in the deployed or playing position.
Figure 36:
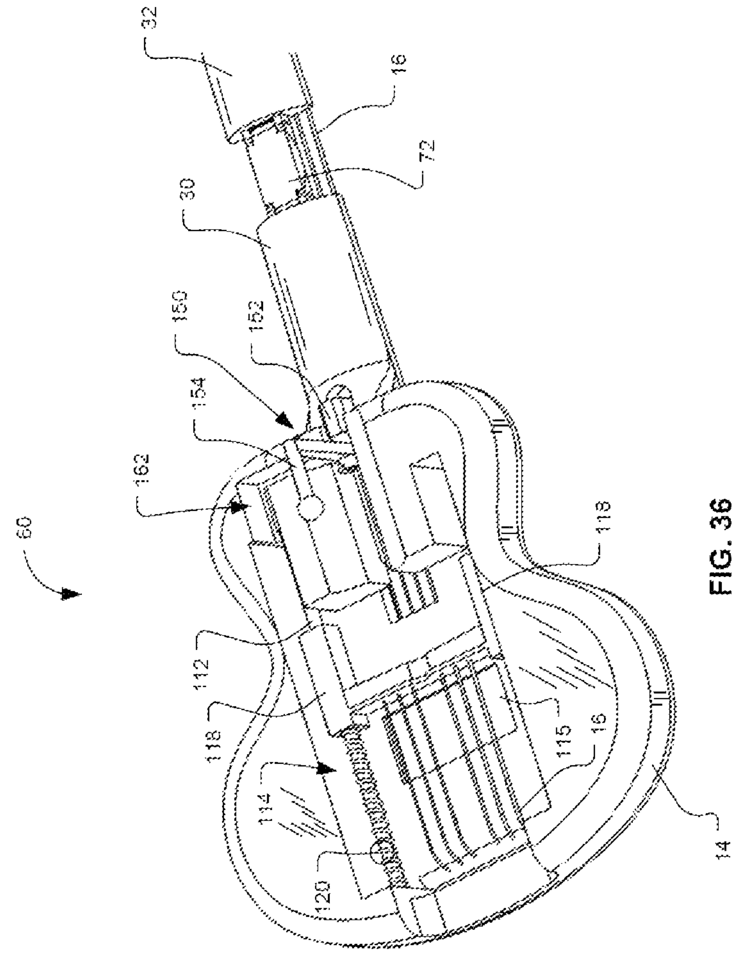
FIG. 36 is a partial perspective view of the bottom of the travel guitar of the type shown in FIGS. 9-10 except with a bolt-action actuation mechanism in an extended state to avail a hinged region of the translating truss assembly to enable folding the travel guitar according to one aspect.
Figure 37:
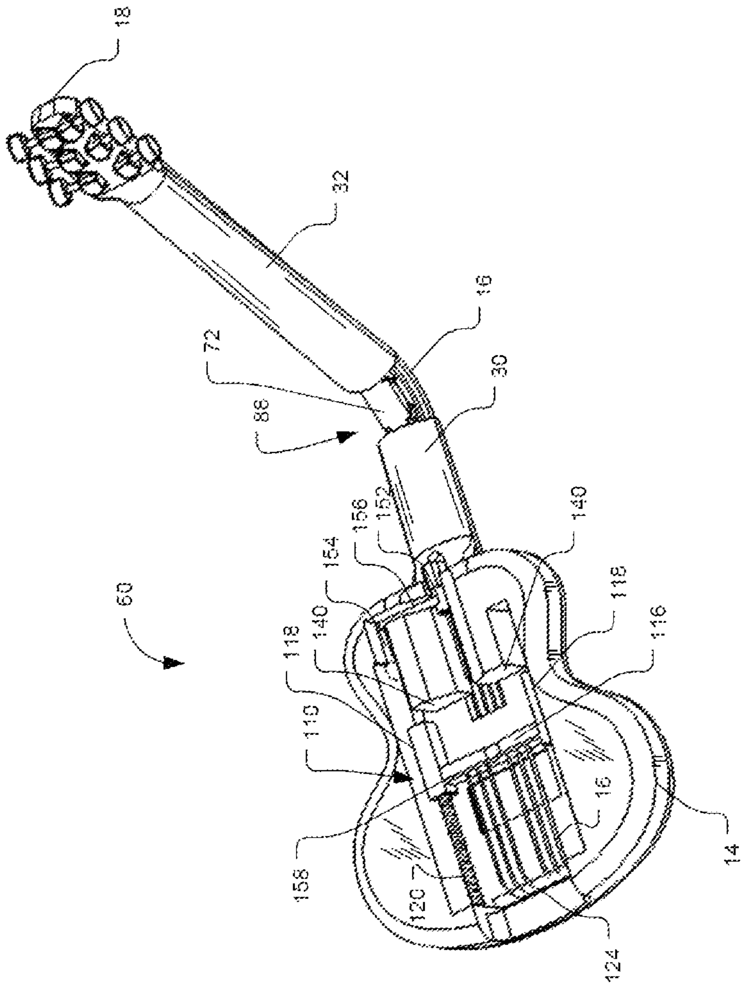
FIG. 37 is a perspective view of the bottom of the travel guitar of the type shown in FIGS. 9-10 except with a bolt-action actuation mechanism illustrating the step of folding the upper neck portion away from the playing position (rotating counter-clockwise as shown in FIG. 37)
Figure 38:
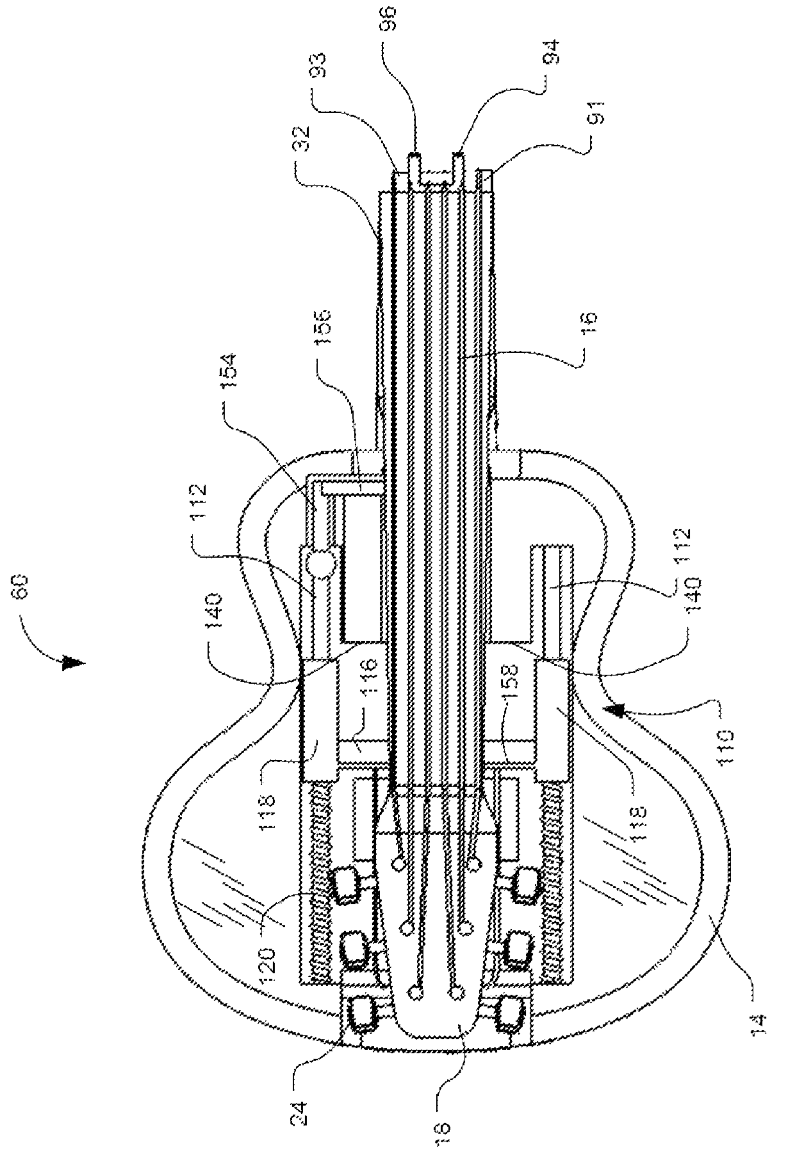
FIG. 38 is a top view of the underside of the travel guitar of the type shown in FIGS. 9-10 except with a bolt-action actuation mechanism with the travel guitar in a fully folded or undeployed state.

In use, the bolt element 150 starts in the position shown in FIG. 34 with the boss 152 engaged with the raised lip or wall 158 on the cross-bar 116 of the translating bridge element 110. The ball-ended grip member 154 is nested within the recess 114 and located adjacent to and generally parallel with the rod 112. In order to start the folding process, the user must first grasp the ball-ended grip member 154 and rotate it approximately 180 degrees to the position shown in FIG. 35. This will serve to release or unthread the engagement between the cylinder 152 and the cross-bar 116 of the translating bridge element 110. This disengagement thereby causes the translating bridge element 110 to move towards the back end of the body 14, which quickly and effectively detensions the strings 16 from the fully tensioned state into a largely detensioned state. The user may then rotate the ball-ended grip member 154 back approximately 90 degrees to return to the approximate center or midline of the body 14. With reference to FIG. 36, the user may then move or translate the ball-ended grip member 154 towards the front end of the body 14 in order to drive the upper neck portion 32 away from the lower neck portion 30 to avail or expose the hinged region 88 and middle element 72 of the translating truss assembly 66. Referring to FIG. 37, the grip member 154 may thereafter be rotated another 90 degrees to nest and secure the grip member 154 within a recess 162 disposed near the front end of the body 14. At that point, the upper neck portion 32 may be rotated away from the playing position as described above into the folded or undeployed state shown in FIG. 38.

Figure 39:
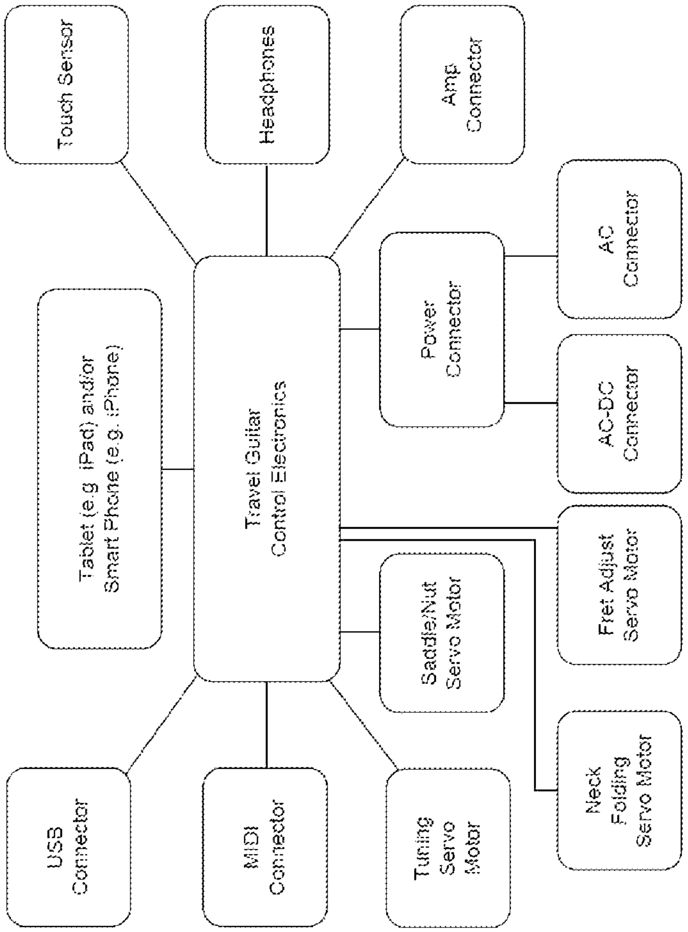
FIG. 39 is a diagrammatic view of exemplary electrical components associated with any or all of the disclosed travel guitars according to one aspect.

Any of the foldable stringed instruments disclosed or contemplated herein may be equipped with any of a variety of electrical or electronic features, such as (but not limited to) those shown in FIG. 39. The tablet computer and/or smart phone described herein may be coupled to the control electronics (e.g. via proprietary Apple connectors if an iPad and/or an iPhone is used) to electrically connect any of the components forming the control electronics or otherwise coupled to the control electronics. When so employed, the smart phone and/or tablet may be equipped with any of a variety of software applications for driving at least one of the operation, functionality and effects associated with the foldable stringed instrument.

The on-board electronics and/or electronics or software on the tablet and/or smart phone may operate any of the servo motors contemplated as part of the travel guitar of the present invention, including but not limited to servo motors for: (a) moving the neck relative to the body; (b) adjusting the tuning machines 24 in order to auto-tune the travel guitar; (c) adjusting the height of the individual frets on the fret board and/or the saddle on the body and/or the nut on the head of the neck (such height adjustment of the frets, saddle and/or nut may be performed to help tune the travel guitar and/or adjust the action of the strings according to user preference); and (d) adjusting the location of the translating bridge assembly and/or translating truss rods or assembly according to certain aspects.

The on-board components may also include a battery or battery pack to provide power, an electrical pick-up disposed near the musical strings for picking up electrical signals generated from playing of the musical strings, a piezo electric sensor for sensing vibrations generated from playing the musical strings, a microphone disposed near the musical strings for transmitting sound generated from playing the musical strings, a wireless receiver for receiving wireless communications from an external wireless transmitter, a tuner for tuning the musical strings, a speaker for playing sound generated from at least one of playing the musical strings and a sound generator, and an effects generator for at least one of modifying the sound generated by playing the musical strings and generating sounds other than those generated by playing the musical strings.

The travel guitar may also include any of a variety of connectors, including (by way of example only) an audio jack for connecting headphones, an input jack for coupling at least one of a smart phone and a tablet computer, and an output jack for connecting to at least one of an external amplifier, an external speaker, and an external mixing board.

A power connector is preferably provided so that a suitable AC/DC power converter can be connected an AC power source (e.g. wall outlet) to power the electrical components of the travel guitar. Any number of connectors may be provided (e.g. USB, Firewire, etc. . . . ) so that the tablet computer and/or smart phone can be connected to an external computer, video game console, or the like to either interact with such or be powered therefrom. A MIDI connector is preferably provided so that the travel guitar can be connected to any MIDI compatible equipment. Connectors may also be provided for headphones (and/or external speakers), as well as for a guitar amplifier. Any such electrical connectors can be utilized in any combination and/or any other suitable type of electrical connection can additionally be provided.

Any of the features or attributes of the above the above described embodiments and variations can be used in combination with any of the other features and attributes of the above described embodiments and variations as desired.

The travel guitars set forth herein overcome or at least improve upon the disadvantages of the prior art by providing a reduced profile for ease of travel and predictable tuning and quality guitar play. Moreover, by using commercially available a computer tablet and/or smart phone, the effective cost of the travel guitar is reduced to the user because those devices are available for other uses.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. A stringed instrument, comprising:

a body having an upper surface, a lower surface, and a string aperture configured to allow an instrument string to pass from a translating string anchor disposed within said body to said upper surface;

a neck assembly including an upper neck portion and a lower neck portion, said lower portion configured to be coupled to said body, said upper neck portion including a headstock; and a handle coupled to said lower surface of said body configured to move said translating string anchor between a first location and a second location, said handle configured to be rotated to a first, locked position such that said translating string anchor is moved to said first location to enable said instrument string to be tuned to a first string tension level when said upper neck portion and said lower neck portion are positioned in an aligned state for play, and said handle configured to be rotated to a second, unlocked position such that said translating string anchor is moved to said second location to lower said instrument string to a second string tension level to enable said upper neck portion to be moveable relative to said lower neck portion.

2. The stringed instrument of claim 1, wherein moving said handle into said first, locked position causes said translating string anchor to slidably translate within said body in a first direction to tension said instrument string to said first string tension level after said upper neck portion is brought into linear alignment with said lower neck portion.

3. The stringed instrument of claim 2, wherein moving said handle into said second, unlocked position allows said translating string anchor to slidably translate within said body in a second direction to detension said instrument string and enable said upper neck portion to be moved relative to said lower neck portion.

4. The stringed instrument of claim 3, further comprising at least one spring that cooperates with said translating string anchor to allow said translating string anchor to slidably translate within said body when said upper neck portion is moved relative to said lower neck portion.

5. The stringed instrument of claim 1, further comprising: at least one elongate rod configured to align said upper neck portion relative to said lower neck portion.

6. The stringed instrument of claim 5, wherein said at least one elongate rod is configured to extend from said lower neck portion into said upper neck portion.

7. The stringed instrument of claim 1, wherein said lower and upper neck portions are moveably coupled such that said lower and upper neck portions are moveable relative to one another when said instrument string is in a detensioned state.

8. The stringed instrument of claim 1, wherein said first string tension level is approximately 118 pounds.

9. The stringed instrument of claim 1, wherein said second string tension level is approximate 3 pounds.

10. The stringed instrument of claim 1, wherein said upper neck portion is moveable relative to said lower neck portion about a hinge when said handle is in said second, unlocked position.

11. The stringed instrument of claim 1, wherein said upper neck portion is moveable away from said lower neck portion when said handle is in said second, unlocked position.

12. The stringed instrument of claim 1, wherein said string aperture is configured to allow passage of a plurality of instrument strings from said translating string anchor to said upper surface.

13. A stringed instrument, comprising:

a body having an upper surface, a lower surface, and a string aperture configured to allow passage of an instrument string from a translating string anchor disposed within said body to said upper surface;

a neck assembly including an upper neck portion and a lower neck portion, said lower portion configured to be coupled to said body, said upper neck portion including a headstock; and a handle coupled to said lower surface of said body and configured to move said translating string anchor between a first location and a second location, said handle configured to rotate between a first, locked position in which said translating string anchor is in said first location and said instrument string is tuned to a first string tension level when said upper neck portion and said lower neck portion are positioned in an aligned state for play, and a second, unlocked position in which said translating string anchor is in said second location and said instrument string is lowered to a second string tension level.

14. The stringed instrument of claim 13, wherein moving said handle into said first, locked position causes said translating string anchor to slidably translate within said body in a first direction to tension said instrument string to said first string tension level after said upper neck portion is brought into linear alignment with said lower neck portion.

15. The stringed instrument of claim 14, wherein moving said handle into said second, unlocked position allows said translating string anchor to slidably translate within said body in a second direction to detension said instrument string and enable said upper neck portion to be moved relative to said lower neck portion.

16. The stringed instrument of claim 13, wherein said upper neck portion is moveable relative to said lower neck portion when said handle is in said second, unlocked position.

17. The stringed instrument of claim 13, wherein said upper neck portion is moveable relative to said lower neck portion about a hinge when said handle is in said second, unlocked position.

18. The stringed instrument of claim 13, wherein said first string tension level is approximately 118 pounds.

19. The stringed instrument of claim 13, wherein said second string tension level is approximate 3 pounds.

* * * * *